(12) United States Patent
Harward et al.

(10) Patent No.: US 9,179,800 B2
(45) Date of Patent: Nov. 10, 2015

(54) HOUSEHOLD APPLIANCE HAVING A DEPLOYABLE WARMING DRAWER MODULE

(75) Inventors: Samuel Harward, Knoxville, TN (US); Rose Marie Parker, Caryville, TN (US); Michael Rutherford, Duff, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 629 days.

(21) Appl. No.: 13/483,098

(22) Filed: May 30, 2012

(65) Prior Publication Data

US 2013/0323663 A1 Dec. 5, 2013

(51) Int. Cl.

| | | |
|---|---|---|
| A47J 36/26 | (2006.01) | |
| F24C 15/18 | (2006.01) | |
| H05B 3/30 | (2006.01) | |
| A47J 39/02 | (2006.01) | |
| F24C 15/36 | (2006.01) | |
| H05B 3/68 | (2006.01) | |

(52) U.S. Cl.
CPC .............. *A47J 39/02* (2013.01); *F24C 15/18* (2013.01); *F24C 15/36* (2013.01); *H05B 3/68* (2013.01)

(58) Field of Classification Search
None
See application file for complete search history.

(56) References Cited

U.S. PATENT DOCUMENTS

| | | | | |
|---|---|---|---|---|
| 2,976,386 A * | 3/1961 | Salton | ..................... | 219/450.1 |
| 3,317,709 A * | 5/1967 | Beasley | ................... | 219/448.17 |
| 3,521,029 A * | 7/1970 | Toyooka et al. | ............... | 219/201 |
| 3,883,719 A * | 5/1975 | Hurko | ......................... | 219/466.1 |
| 3,987,275 A * | 10/1976 | Hurko | ......................... | 219/451.1 |
| 4,068,115 A * | 1/1978 | Mack et al. | ..................... | 219/386 |
| 4,910,386 A * | 3/1990 | Johnson | ......................... | 219/385 |
| 5,140,134 A * | 8/1992 | Reusche et al. | ............... | 219/441 |
| 5,198,638 A * | 3/1993 | Massacesi | ..................... | 219/209 |
| 5,276,310 A * | 1/1994 | Schmidt et al. | ............... | 219/521 |
| 5,345,063 A * | 9/1994 | Reusche et al. | ............... | 219/441 |
| 5,508,495 A * | 4/1996 | Yahav et al. | ................. | 219/466.1 |
| 6,037,572 A * | 3/2000 | Coates et al. | .............. | 219/451.1 |
| 6,166,353 A * | 12/2000 | Senneville et al. | ........... | 219/385 |
| 6,384,380 B1 * | 5/2002 | Faries et al. | ..................... | 219/385 |
| 6,525,298 B1 * | 2/2003 | Hunts | ............................ | 219/400 |
| 7,009,151 B2 * | 3/2006 | Lee | ............................ | 219/460.1 |
| 7,170,035 B2 * | 1/2007 | Peterson et al. | .............. | 219/386 |
| 7,208,700 B2 * | 4/2007 | Peterson et al. | .............. | 219/386 |
| 7,235,762 B2 * | 6/2007 | Gagas et al. | ................... | 219/400 |
| 7,279,659 B2 * | 10/2007 | Gagas et al. | ................... | 219/400 |
| 7,326,885 B2 * | 2/2008 | Lockwood et al. | ......... | 219/443.1 |
| 7,488,919 B2 * | 2/2009 | Gagas et al. | ................... | 219/400 |
| 7,619,182 B2 * | 11/2009 | Morrow et al. | ................ | 219/391 |
| 8,291,816 B2 * | 10/2012 | Iwamoto et al. | ................ | 99/467 |
| 2003/0029858 A1 * | 2/2003 | Gratz et al. | .............. | 219/448.17 |

(Continued)

*Primary Examiner* — Joseph M Pelham
(74) *Attorney, Agent, or Firm* — James E. Howard; Andre Pallapies

(57) ABSTRACT

A household appliance includes a warming drawer housing having an interior chamber and a warming drawer module having a warming area for placing items to be warmed and a heating device that heats the area. The warming drawer module is movable between a first position in which the warming drawer module is in the interior chamber of the warming drawer housing and the warming area is concealed from an outside of the warming drawer housing by the warming drawer housing, and a second position in which a part of the warming drawer module is outside the warming drawer housing and a portion of the warming area is exposed to the outside of the warming drawer housing. The heating device is coupled to and movable with the warming drawer module between the first position and the second position.

31 Claims, 16 Drawing Sheets

(56) References Cited

U.S. PATENT DOCUMENTS

| | | | |
|---|---|---|---|
| 2004/0149722 A1* | 8/2004 | Schnell et al. | 219/460.1 |
| 2004/0169035 A1* | 9/2004 | Bollmers et al. | 219/520 |
| 2005/0211696 A1* | 9/2005 | Adamski | 219/400 |
| 2005/0274712 A1* | 12/2005 | Gagas et al. | 219/494 |
| 2006/0043087 A1* | 3/2006 | Gagas et al. | 219/391 |
| 2006/0049172 A1* | 3/2006 | Gagas et al. | 219/521 |
| 2006/0278629 A1* | 12/2006 | Gagas et al. | 219/385 |
| 2008/0173631 A1* | 7/2008 | Gagas et al. | 219/400 |
| 2010/0133263 A1* | 6/2010 | Toyoda et al. | 219/681 |
| 2011/0156564 A1* | 6/2011 | Park | 312/403 |
| 2014/0231404 A1* | 8/2014 | Struck | 219/218 |

* cited by examiner

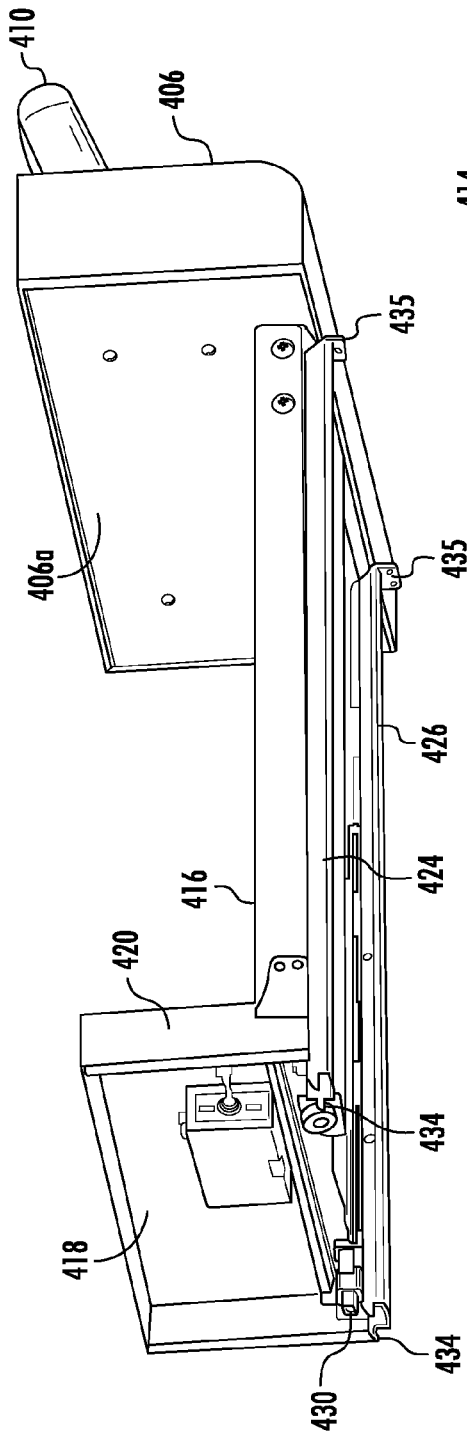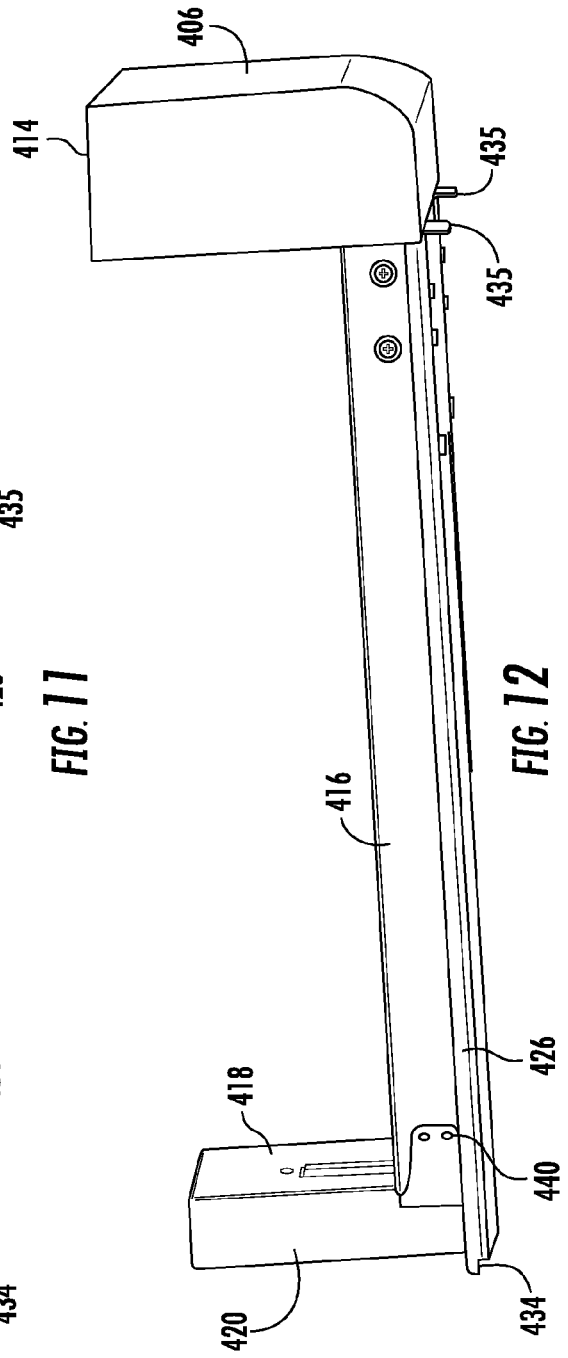

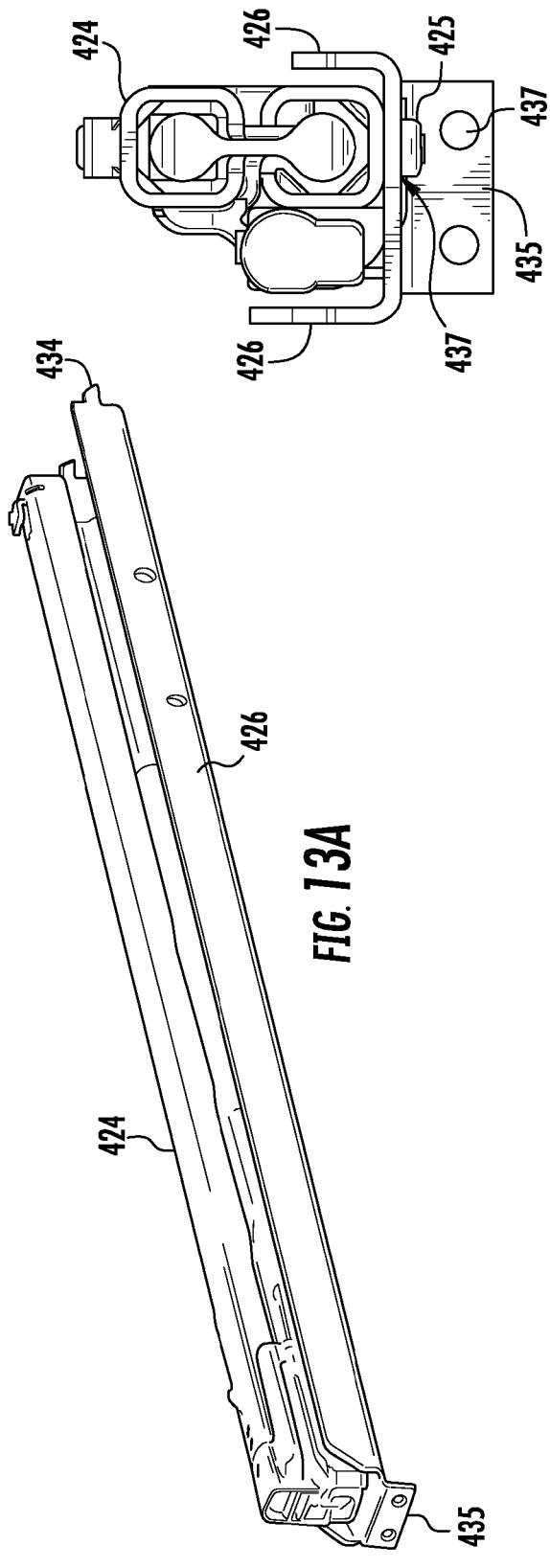
FIG. 13A
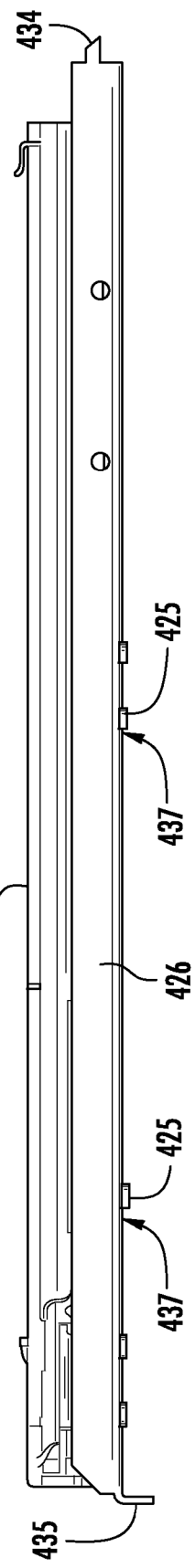
FIG. 13B
FIG. 13C

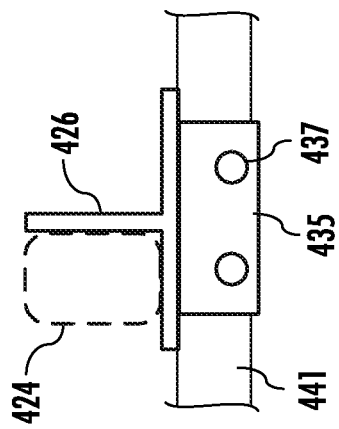
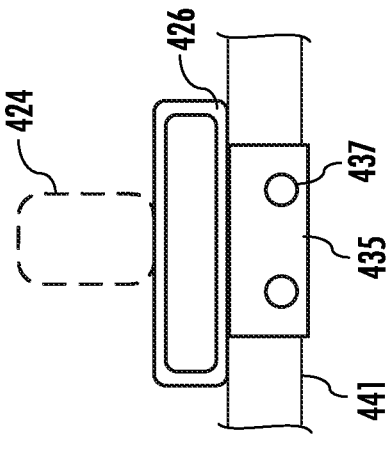
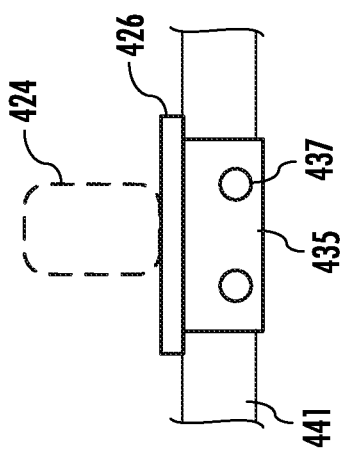
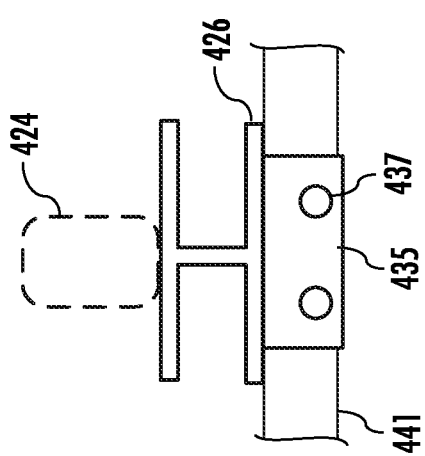
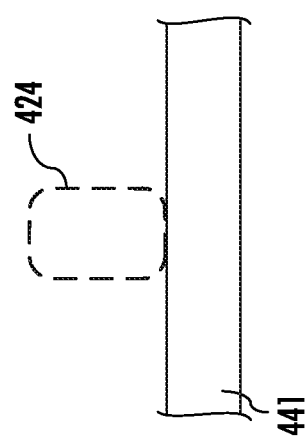
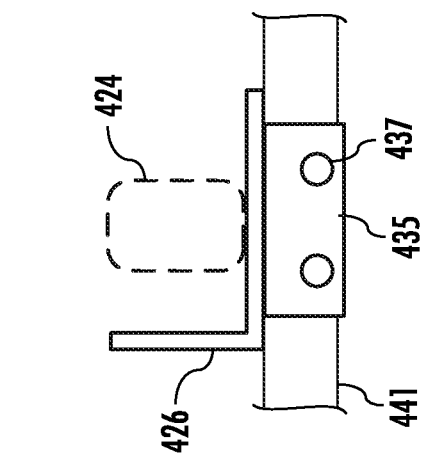

HOUSEHOLD APPLIANCE HAVING A DEPLOYABLE WARMING DRAWER MODULE

CROSS-REFERENCES TO RELATED APPLICATIONS

This application is related to Applicants' co-pending U.S. applications, which are filed concurrently herewith, entitled "HOUSEHOLD APPLIANCE HAVING A WARMING DRAWER WITH A THERMALLY CONDUCTIVE LAYER", Ser. No. 13/483,097; "HOUSEHOLD APPLIANCE HAVING A DRIP GUARD FOR A WARMING DRAWER", Ser. No. 13/483,096; "HOUSEHOLD APPLIANCE HAVING A THERMOSTAT RETAINER FOR A THERMOSTAT OF A WARMING DRAWER", Ser. No. 13/483,092; "HOUSEHOLD APPLIANCE HAVING EMBOSSES SUPPORTING A GLASS HEATING ELEMENT OF A WARMING DRAWER", Ser. No. 13/483,094, each of which is incorporated herein by reference in its entirety.

FIELD OF THE INVENTION

The present invention is directed to a household appliance having a warming drawer, and more particularly, to a household appliance having a warming drawer including a deployable warming drawer module having heating elements movable with the warming drawer.

BACKGROUND OF THE INVENTION

Some conventional household appliances may include a warming drawer for warming one or more items P such as food, cookware, cutlery, etc. or maintaining a predetermined temperature of the items. As shown for example in FIG. 1, a conventional warming drawer 1 commonly may include a housing 2 and a drawer 4 having four walls 6, a floor 8, and a handle 10, similar to an ordinary drawer. The drawer 4 may be slidably coupled to the housing 2 by ordinary drawer slides 12 mounted on the interior sidewalls of the housing 2 or to the floor of the housing 2. The functional parts of the warming drawer commonly are attached to the housing 2 of the warming drawer 1. For example, a heating element 14 commonly is fixed to the interior of the housing 2, such as on the floor of the housing 2. In operation, the drawer 4 moves over the heating element 14 when the drawer 4 is in a closed position inside the housing 2 to heat the items P in the drawer 4. The controls (not shown) for the conventional warming drawer commonly are provided on the warming drawer housing 2 or on the housing of the appliance.

SUMMARY OF THE INVENTION

The present invention recognizes that the conventional warming drawer, such as a warming drawer in which a heating element is fixed to the interior of the housing and the warming drawer moves over the heating element when the warming drawer is in a closed position, may have limited or reduced heat transfer between the heating elements and the warming drawer and the contents of the warming drawer and the heat transfer may vary for different positions in the drawer, thereby resulting in hot spots in the drawer. The present invention further recognizes that assembly and repair work for components of such a warming drawer commonly may require access from multiple sides, which may be difficult to perform with the conventional warming drawer particularly where the appliance is installed in cabinetry since the functional parts of the conventional warming drawer commonly are attached to the housing of the appliance. In these cases, the conventional warming drawer assembly, including the warming drawer housing, commonly must be removed completely from the appliance or cabinetry in order to perform repairs, replacement, and/or cleaning by a user or technician. Additionally, the present invention further recognizes that the assembly of the parts of the warming drawer within the warming drawer housing during manufacturing can be complex and time-consuming.

The present invention solves the foregoing problems and others by providing a warming drawer according to the exemplary embodiments described herein in which functional parts of the warming drawer are assembled together into a sub-assembly or warming drawer module that easily can be inserted and removed from the warming drawer housing by manufacturing personnel, a user, or a repair technician when working only from the front of the appliance. Electrical and control wires and cable, as well as wire and cable routing features, also may be coupled to the deployable warming drawer module so that manufacturing personnel, a user, or a repair technician do not have to route wires or cables when installing and/or removing the warming drawer module.

An exemplary embodiment of a warming drawer can include, for example, a warming drawer housing having an interior chamber and a deployable warming drawer module having a surface for placing items to be warmed. The warming drawer module can be movable between a first position in which the warming drawer module is in the warming drawer housing and the surface is not exposed to an outside of the warming drawer housing, and a second position in which a part of the warming drawer module is outside the warming drawer housing and a part of the surface is exposed to the outside of the warming drawer housing. The modular warming drawer can include a heating device coupled to and movable with the warming drawer between the first position and the second position. In this way, the exemplary embodiments can improve heat transfer, and provide more uniform and predictable heat transfer, between the heating element and the contents of the warming drawer module, thereby providing uniform heating at various positions in the drawer and reducing or eliminating hot spots in the warming drawer module. The exemplary embodiments also can simplify and improve the ease with which assembly and repair work can be performed for components of the warming drawer by enabling the warming drawer module to be removed from the warming drawer housing with a simple connection such that a user or technician can easily and simply perform repairs, replacement, and/or cleaning without having to remove the warming drawer housing. The exemplary embodiments also may simplify the manufacturing process and reduce labor and time for manufacturing, thereby reducing manufacturing costs.

As explained above, the controls for a conventional warming drawer (e.g., as shown in FIG. 1) commonly are provided on the warming drawer housing 2. The present invention recognizes that the controls for controlling an operation of the warming drawer alternatively may be provided on the drawer, for example, on the front of the drawer. In this case, a power source commonly can be selectively connected and disconnected by a switch that is activated by the movement of the drawer into the stored position in the housing such that the controls are powered by a power source only when the drawer is in the closed position within the housing. For example, the drawer can include an electrical connection that engages a corresponding electrical connection on the housing only when the drawer is in the closed position within the housing and disengages the electrical connection when the drawer is deployed from the housing.

Concealed controls that are not visible to the user when the drawer is in a closed position have become increasingly popular. The present invention recognizes that an arrangement in which the controls are not supplied with power when the warming drawer module is in the deployed position will not support the use of concealed controls, since concealed controls are accessible only when the drawer is deployed, a power supply will need to be provided to the concealed controls when the drawer is in a deployed position. To solve these problems and others, an exemplary embodiment of a warming drawer module can include a power source coupled to the controls on the warming drawer module and the heating device and supplying power to at least the controls when the modular warming drawer is in both the first position and the second position. In this way, the exemplary embodiment can include concealed controls for controlling operation of the warming drawer, the controls being accessible only when the warming drawer module is deployed from the warming drawer housing, and the controls being supplied with power when the warming drawer module is deployed from the warming drawer housing. The warming drawer module can include a switch (e.g., microswitch) that deactivates the heating element when the warming drawer module is in the second position.

In an embodiment, the warming drawer can include four walls (e.g., a front wall, a left-hand sidewall, a right-hand sidewall, and a rear wall) surrounding the warming area for receiving items to be warmed similar to an ordinary drawer. In other exemplary embodiments the warming drawer can include three walls (e.g., a front wall, a left-hand sidewall or right-hand sidewall, and a rear wall), thereby improving and simplifying a user's access to the warming area, for example, for loading and unloading cookware, cutlery, and/or food into and out of the warming drawer module. In yet another exemplary embodiment, the warming drawer module can be configured without sidewalls (e.g., without a left-hand sidewall or right-hand sidewall) connecting a front panel to a rear panel, thereby further improving and simplifying a user's access to the warming area, for example, for loading and unloading cookware, cutlery, and/or food into and out of the warming drawer module. In still other embodiments, the warming drawer module can include only the front wall (e.g., without a left-hand sidewall, right-hand sidewall, or a rear wall).

The present invention recognizes that the mass of the items to be warmed or maintained at a particular temperature in the warming drawer may result in deflection of one or more parts of the warming drawer housing and/or module. For example, the mass of the items may result in deflection of a part of the floor of the warming drawer module when the warming drawer module is in a loaded state (e.g., a partially loaded or fully loaded state) with the items to be warmed. In another example, the mass of the items in the warming drawer may result in deflection of a wall or floor of the warming drawer housing, for example, at a location where the slides are coupled to the warming drawer housing, or in a deflection of the drawer slides of the warming drawer module, when the warming drawer module is in a loaded state and/or when the warming drawer module is deployed from the housing and exerts cantilever forces on the location when the slides are coupled to the wall or floor of the warming drawer housing. Such deflections can result in a so-called "drum" flex (e.g., the floor acting like a drum), for example, when the warming drawer module is loaded and unloaded, or when the warming drawer module is deployed or returned to a stored position.

Moreover, the present invention recognizes that the overall mass of the warming drawer module may be increased by the provision of the heating device and/or other functional components on the deployable warming drawer module according to the present invention, which may result in further deflection of a part of the warming drawer module or warming drawer housing, such as a floor or wall of the warming drawer housing or warming drawer module, and/or the drawer slides. Furthermore, an exemplary configuration in which the warming drawer module does not include one or more sidewalls connecting a front panel to a rear panel of the warming drawer module according to the exemplary embodiments may reduce or limit the rigidity or stiffness of the warming drawer module, thereby potentially resulting in a deflection of the frame of the warming drawer module in a loaded state or a deployed state. The conventional devices do not provide these exemplary features, and therefore, the conventional art has not contemplated these problems or had any need to address or solve these problems.

The present invention can solve these and other problems by providing an exemplary warming drawer including a warming drawer module having means for increasing the rigidity and stiffness and reducing deflection of the warming drawer module, such as deflection of the floor and/or walls of the warming drawer housing, deflection of the floor, walls, or frame of the warming drawer module, etc. In an exemplary embodiment, the warming drawer module can include one or more channels or supports that can couple (e.g., removably couple) the drawer slides of the warming drawer module (and hence, couple the warming drawer module) to the warming drawer housing, and that can increase the rigidity and stiffness and reduce deflection of the warming drawer module in various loaded and/or deployed states. The channels or supports can have a shape (e.g., cross-sectional shape) that increases the rigidity of the channels, such as a U-shaped, I-shaped, T-shaped, L-shaped, square-shaped, rectangular-shaped, circular-shaped, or oval-shaped cross-section. For example, a drawer slide can be coupled to a channel or support, which in turn is coupled to the warming drawer housing at one or more locations (e.g., floor, sidewall, rear wall, and/or frame of the warming drawer housing).

The channel or support can include one or more locking features or means for securing (e.g., removably securing) the channel to the warming drawer housing, for example, at one or more ends of the channel or a location in between the ends of the channel. In an exemplary embodiment, the locking feature or locking means can include one or more protrusions on an end of the channel that engage an opening in a rear panel of the warming drawer housing. The locking feature or means can include one of more openings for receiving a fastening device for securing (e.g., removably securing) a front end of the channel, or another portion of the channel, to a part of the warming drawer housing that can be easily accessed by a user or technician from the front of the warming drawer. In other embodiments, one or more locking features or means for securing the channels to the warming drawer housing can be coupled to a floor, sidewall, rear wall, or frame of the warming drawer housing, or an intervening part of the warming drawer housing. In this way, the present invention can provide a warming drawer including a warming drawer housing and a deployable warming drawer module having a heating device and/or other functional components coupled to and movable with the warming drawer between the first position and the second position that can reduce or prevent deflection of the warming drawer module, for example, in a deployed position and/or loaded state. Particularly, the exemplary embodiments can reduce or prevent deflection of a warming drawer module, for example, in a deployed position and/or loaded state, when the warming drawer module includes one or more functional parts, such as a heater device and/or other functional parts, as well as cookware, cutlery, and/or food items, etc.

In an exemplary embodiment, one or more of the functional parts of the warming drawer can be coupled (e.g., removably coupled) to the rigid channels or supports of the warming drawer. For example, one or more (or all) of the heated, electrical, and moving components of the warming drawer can be coupled to the rigid channels or supports of the warming drawer module. In this way, when the warming drawer module is removed from the warming drawer housing, all of these functional components will be removed with the warming drawer module in a single step.

For example, in operation, the locking means of the channel(s) of the warming drawer module can be disengaged or unlocked from the warming drawer housing and the warming drawer module (having the functional components such as the heater device) can be removed from the warming drawer module in a single step, thereby facilitating simple, easy, and quick access to the functional components of the warming drawer by a user or technician. More particularly, in an exemplary embodiment, the warming drawer module can include two channels, each having locking features at a rear end of the channel that engages a corresponding locking feature at the back of the warming drawer housing, such as the rear wall of the warming drawer housing. The channel also can include an opening attached at the front of the channel that can be coupled to the warming drawer housing (for example, using a screw) at a location that is easily accessible to a user, personnel, or technician from a front of the appliance. In the example, upon removal of the screw from the front of the channel, the warming drawer module can be released from the locking feature at the rear of the housing and the warming drawer module can be removed from the warming drawer housing. In an embodiment, an electrical connection to the functional components of the warming drawer module can be disconnected from a corresponding electrical connection on the warming drawer housing (e.g., by removing, folding, pivoting, or otherwise relocating or dislocating a rear wall of the warming drawer module to provide access to the electrical connection) after the warming drawer module is deployed and before the warming drawer module is removed from the warming drawer housing. The channel can provide a firm mounting or support for the warming drawer module and allow the entire "functional" warming drawer module to be easily installed/removed by simply sliding the channel in/out of the warming drawer housing. In an embodiment, electrical and control wires and cables, as well as wire and cable routing features, can be attached to the warming drawer module such that manufacturing personnel, repair technicians, etc. do not have to route wires when installing/removing the functional part of the warming drawer.

According to the exemplary embodiments, the present invention can provide flexibility in manufacturing, for example, by enabling manufacturing personnel to build the complete warming drawer module, including the functional components, prior to installing the warming drawer module in the warming drawer housing. The assembled warming drawer module then can be installed into the warming drawer housing by inserting the warming drawer module into the warming drawer housing and connecting one or more wiring and/or control connections. The exemplary embodiments can simplify repairs to functional components of the warming drawer module by facilitating the easy removal of the warming drawer module from the warming drawer housing in a single step and without having to un-install the warming drawer housing or an appliance having the warming drawer housing from an installed position, for example, in a wall or cabinet. The repair technician also will not need to re-route the wiring or cable during removal or re-assembly of the warming drawer module in the warming drawer housing. The exemplary embodiment of warming drawer module having the channels can reduce deflection of one or more parts of the warming drawer housing and/or warming drawer module, for example, when the warming drawer module is in various unloaded, partially loaded, and fully loaded states, as well as when the warming drawer module is in various positions such as a stored position inside the warming drawer housing, a partially deployed position, a fully deployed, and/or when the warming drawer is removed completely from the warming drawer housing.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 11 is a side, perspective view of a warming drawer module according to an exemplary embodiment of the invention.

FIG. 12 is another side, perspective view of a warming drawer module according to an exemplary embodiment of the invention.

FIGS. 13A-13C are a front perspective view, a rear view, and a side view, respectively, of a channel and drawer slide assembly according to an exemplary embodiment of the invention.

FIGS. 14A-14F are front views of channel and drawer slide assemblies according to exemplary embodiments of the invention.

DETAILED DESCRIPTION OF THE EXEMPLARY EMBODIMENTS OF THE INVENTION

Figure 1:
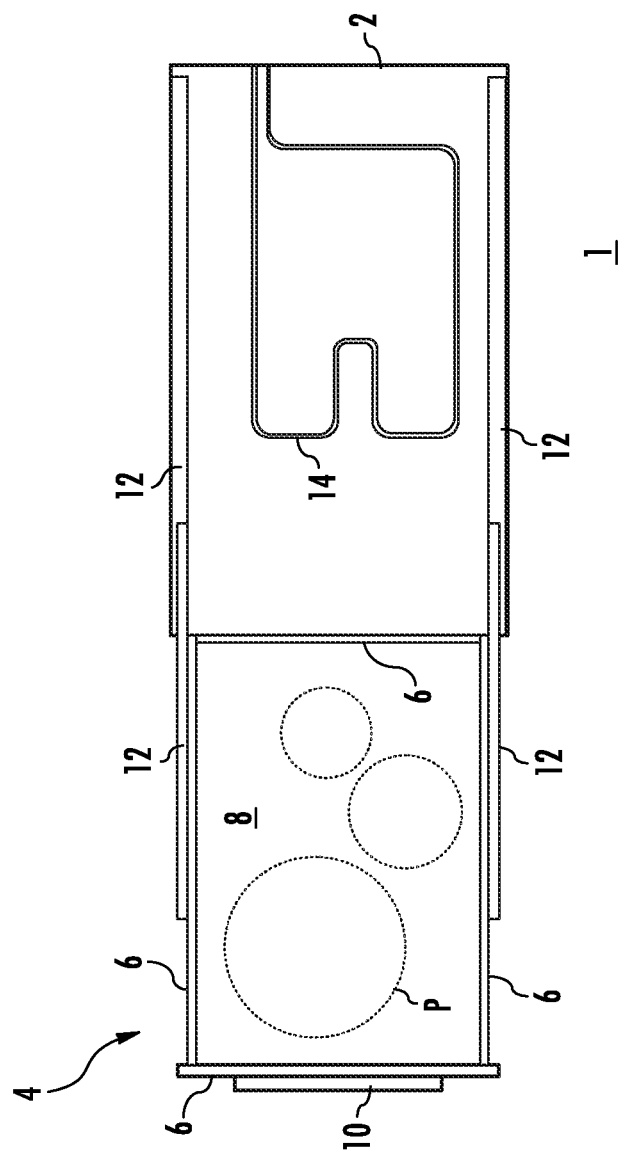
FIG. 1 is a plan view of a conventional household appliance having a warming drawer.
Figure 2:
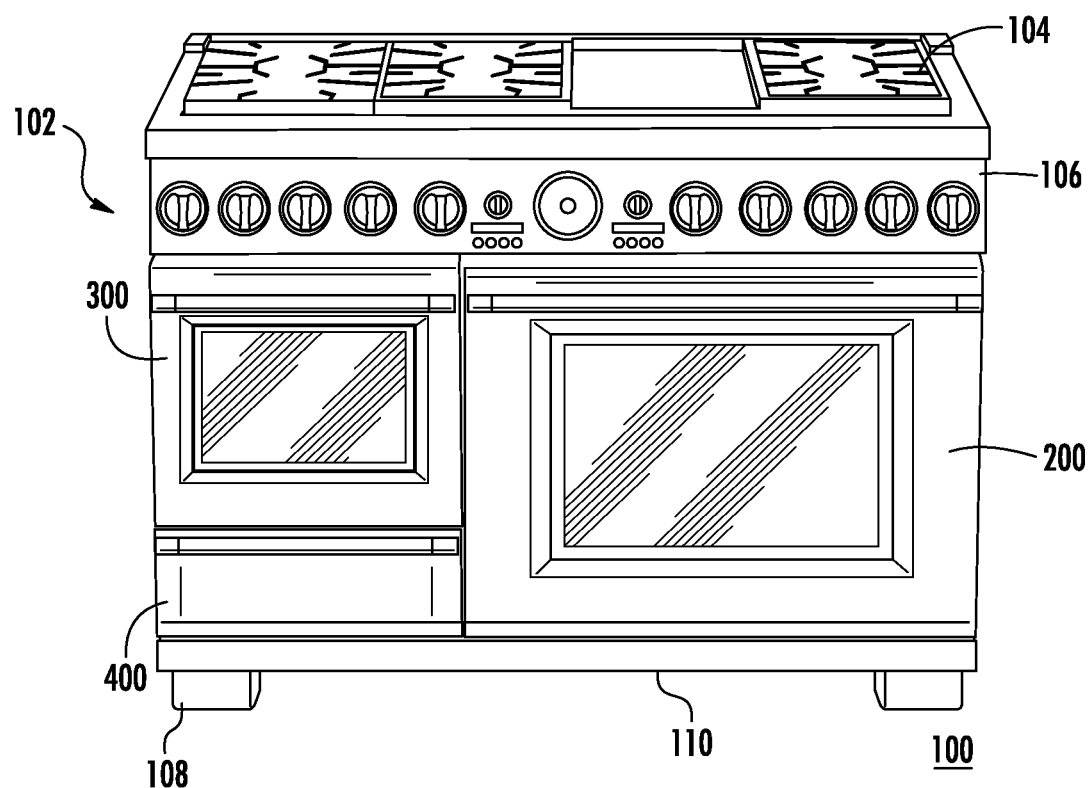
FIG. 2 is a front view of a household appliance according to an exemplary embodiment of the invention.
Figure 3:
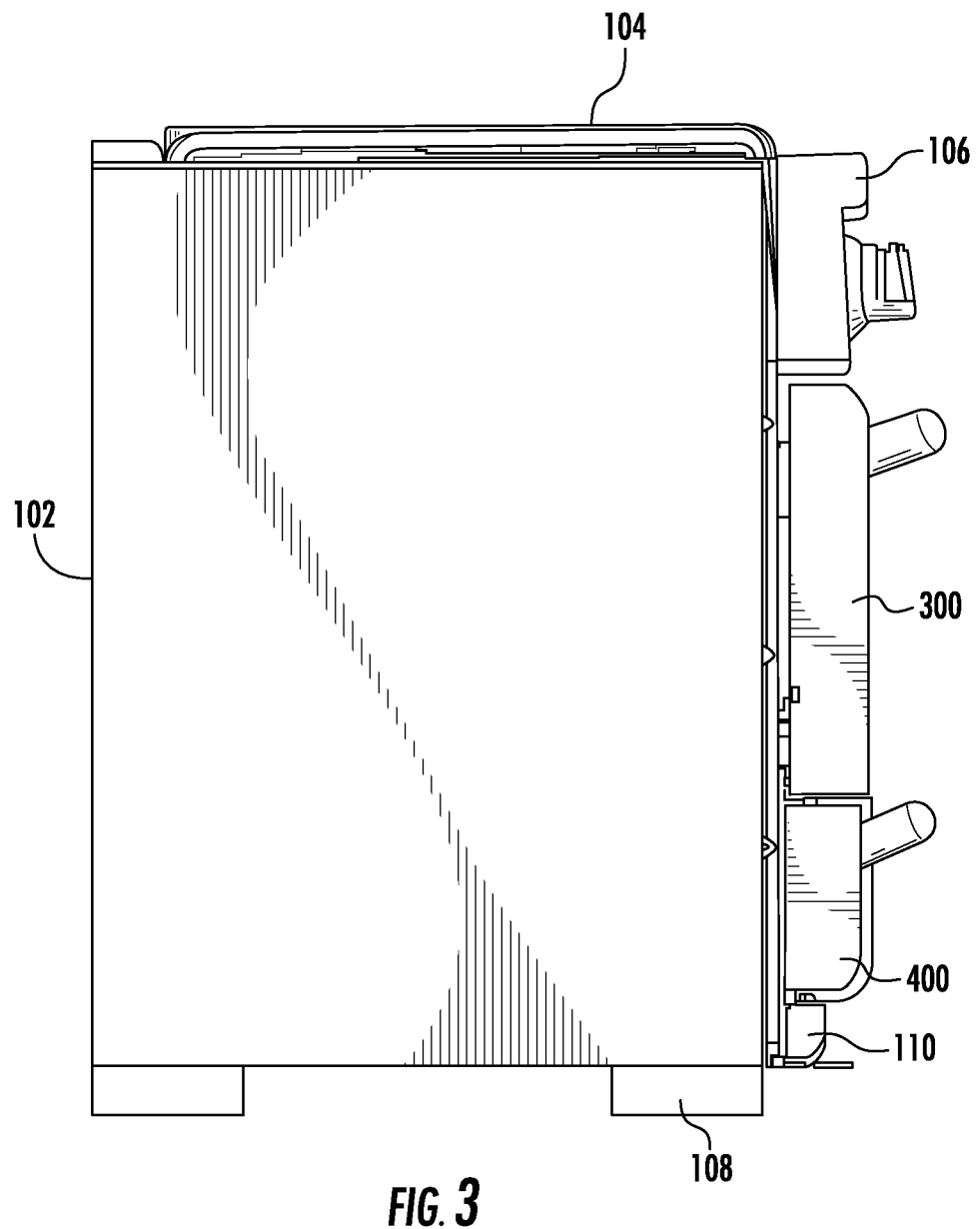
FIG. 3 is a side view of a household appliance according to an exemplary embodiment of the invention.
Figure 4:
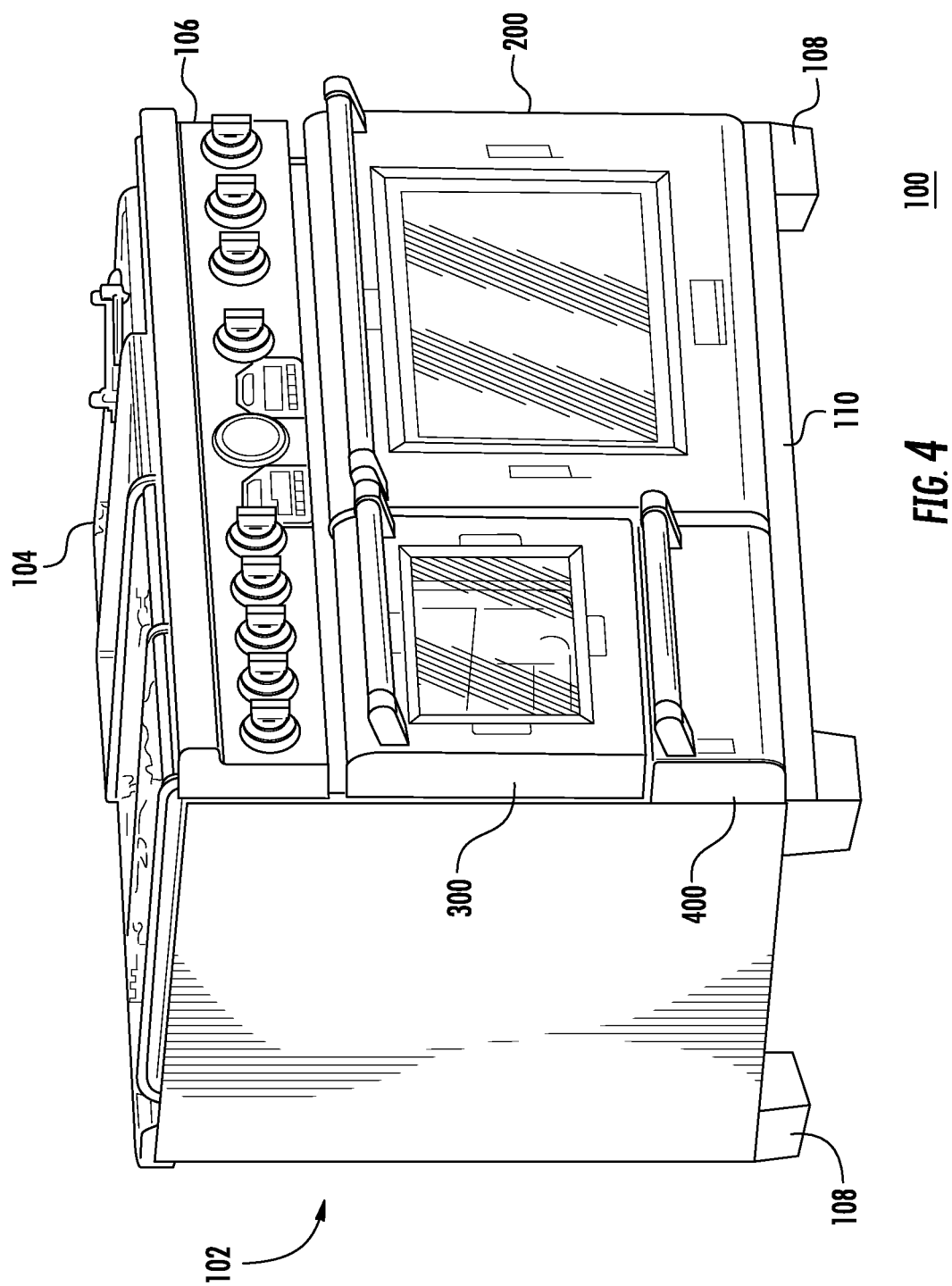
FIG. 4 is a perspective view of a household appliance according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 2-18 illustrate exemplary embodiments of a household appliance having a warming drawer.

With reference to FIGS. 2-5, an exemplary household appliance 100 can include a cooking range having a housing 102 including one or more cooking or warming devices, such as a cooktop, gas oven, electric oven, steam oven, convection oven, and/or warming drawer. In other embodiments, the appliance 100 can include one or more oven cooking chambers without a cooktop. In other embodiments, the appliance 100 can include a standalone appliance, wall mounted appliance, or countertop appliance, such as a stand-alone warming drawer, wall mounted warming drawer, or countertop warming drawer.

Referring again to FIGS. 2-4, an appliance housing 102 can include, for example, a cooktop 104 and control panel 106. The cooktop 104 can include, for example, a gas cooktop having a plurality of gas burners, or other types of cooktops, such as an electric cooktop, an induction cooktop, or the like. The exemplary household appliance 100 can include one or more doors, such as a baking oven door 200, a steam oven door 300, and/or a warming drawer door 400 for providing access to one or more chambers of the housing 102. The housing 102 can include pedestal feet 108 for example for supporting the stand alone appliance and a kick panel 110.

Figure 5:
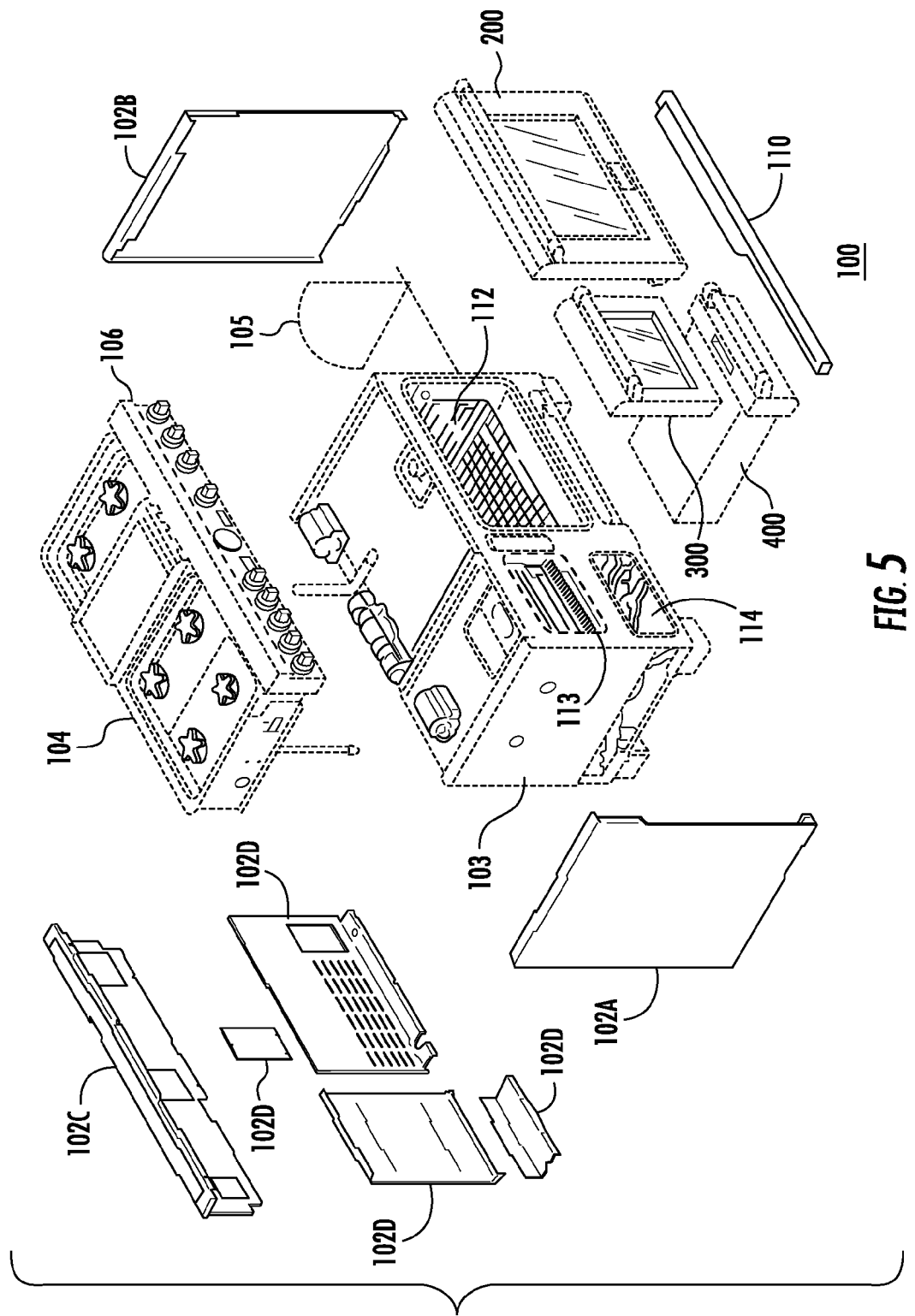
FIG. 5 is an exploded view of a household appliance according to an exemplary embodiment of the invention.

Referring to FIG. 5, the housing 102 of the exemplary household appliance 100 can include, for example, left-hand and right-hand sidewalls 102A, 102B and one or more rear panels 102D on a frame 103. The exemplary appliance 100 can include other devices and features, such as, for example, a backsplash 102C, fume vent or duct, hideaway label plate 105, etc. The frame 103 can include one or more chambers for cooking or warming, such as a baking oven chamber 112, steam oven chamber 113, and/or warming drawer chamber 114.

Figure 6:
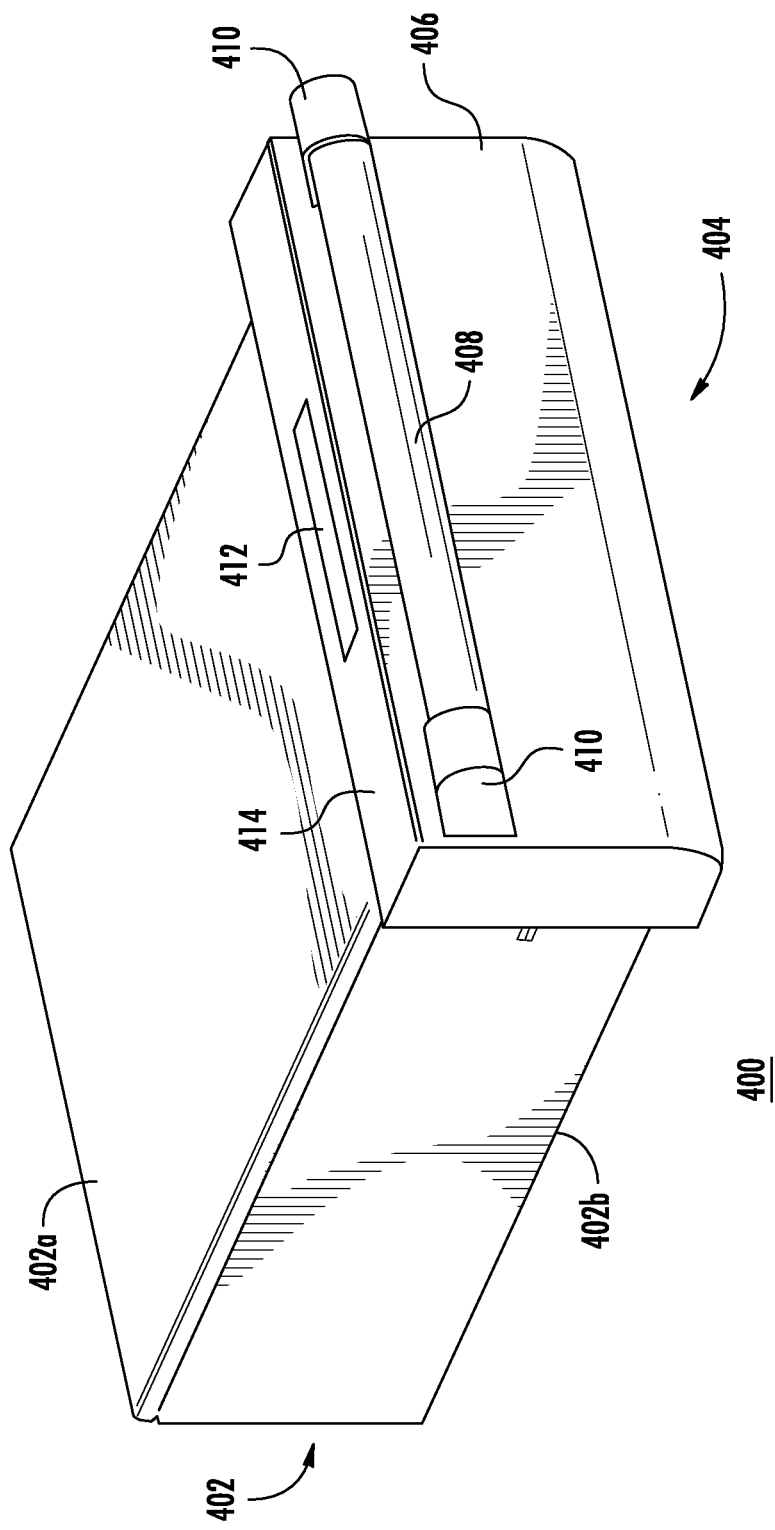
FIG. 6 is a perspective view of a warming drawer according to an exemplary embodiment of the invention.

With reference to FIG. 6, an exemplary embodiment of a modular warming drawer 400 will now be described. The modular warming drawer 400 can include, for example, a warming drawer housing 402 having a top 402a, a bottom (not visible in FIG. 6), sidewalls 402b, and a rear wall (not visible in FIG. 6). The top, bottom, sidewalls, and/or rear wall of the warming drawer housing 402 can be, for example, stainless steel panels. The modular warming drawer 400 can include, for example, a deployable warming drawer module 404 having a front panel 406, a handle 408 coupled to the front panel 406 via, for example, handle mounts 410. The front panel 406 and other portions thereof can include, for example, one or more stainless steel panels. The deployable warming drawer module 404 can include, for example, a control panel 412 for controlling the functions of the warming drawer module 404. The control panel 412 can be, for example, a concealed control panel on or recessed within the upper surface 414 of the front panel 406, which is visible to a user only when the warming drawer module 404 is in a deployed position, as illustrated in FIG. 6. In other embodiments, the control panel 412 can be on or recessed within the face of the front panel 406 or a side of the front panel 406. The control panel 412 can include, for example, one or more touch-activated switches for controlling an operation of the warming drawer 400, such as, for example, an 'OFF' setting, a 'LOW' setting, a 'MED' setting, and a 'HIGH' setting.

Figure 7:
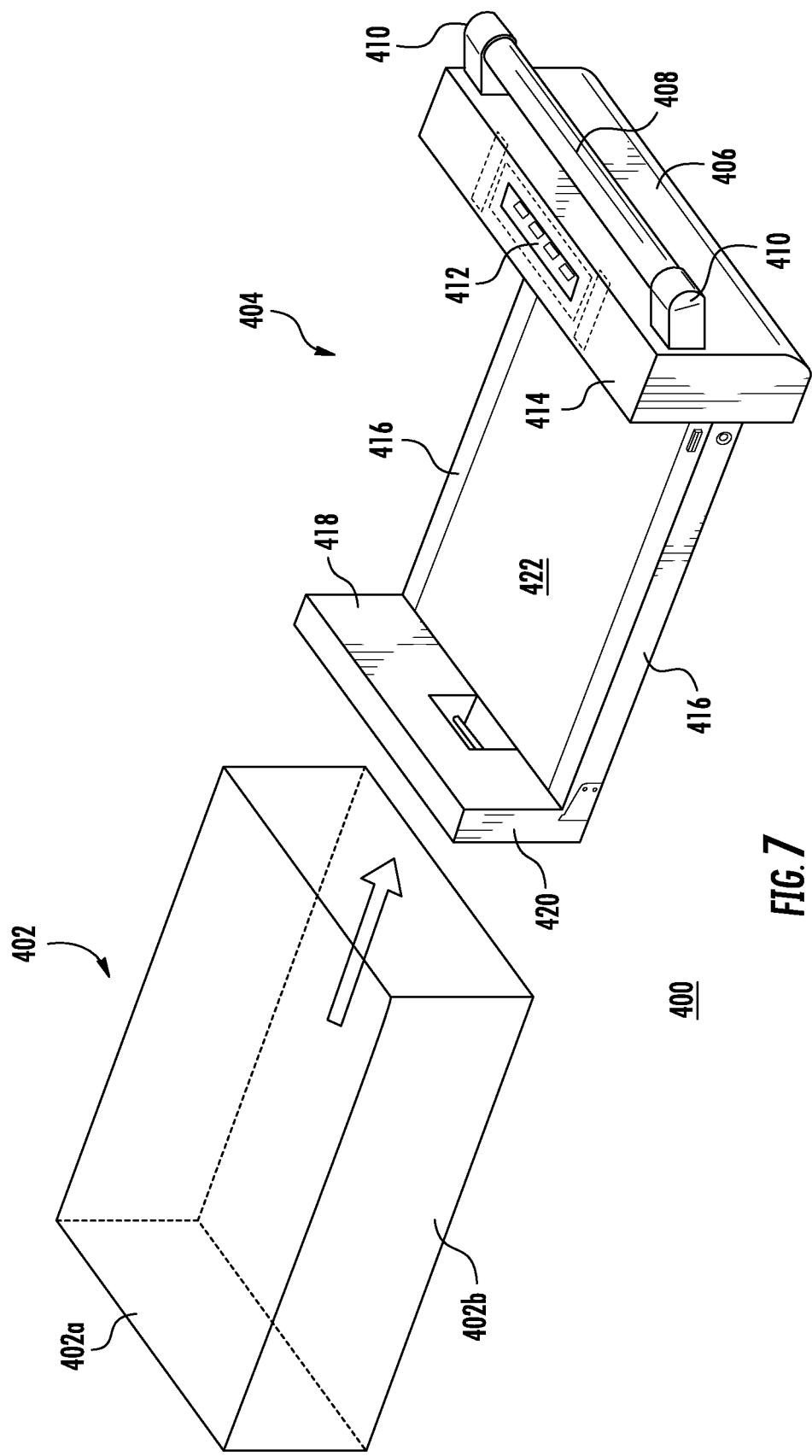
FIG. 7 is a partially exploded perspective view of a warming drawer according to an exemplary embodiment of the invention.
Figure 8:
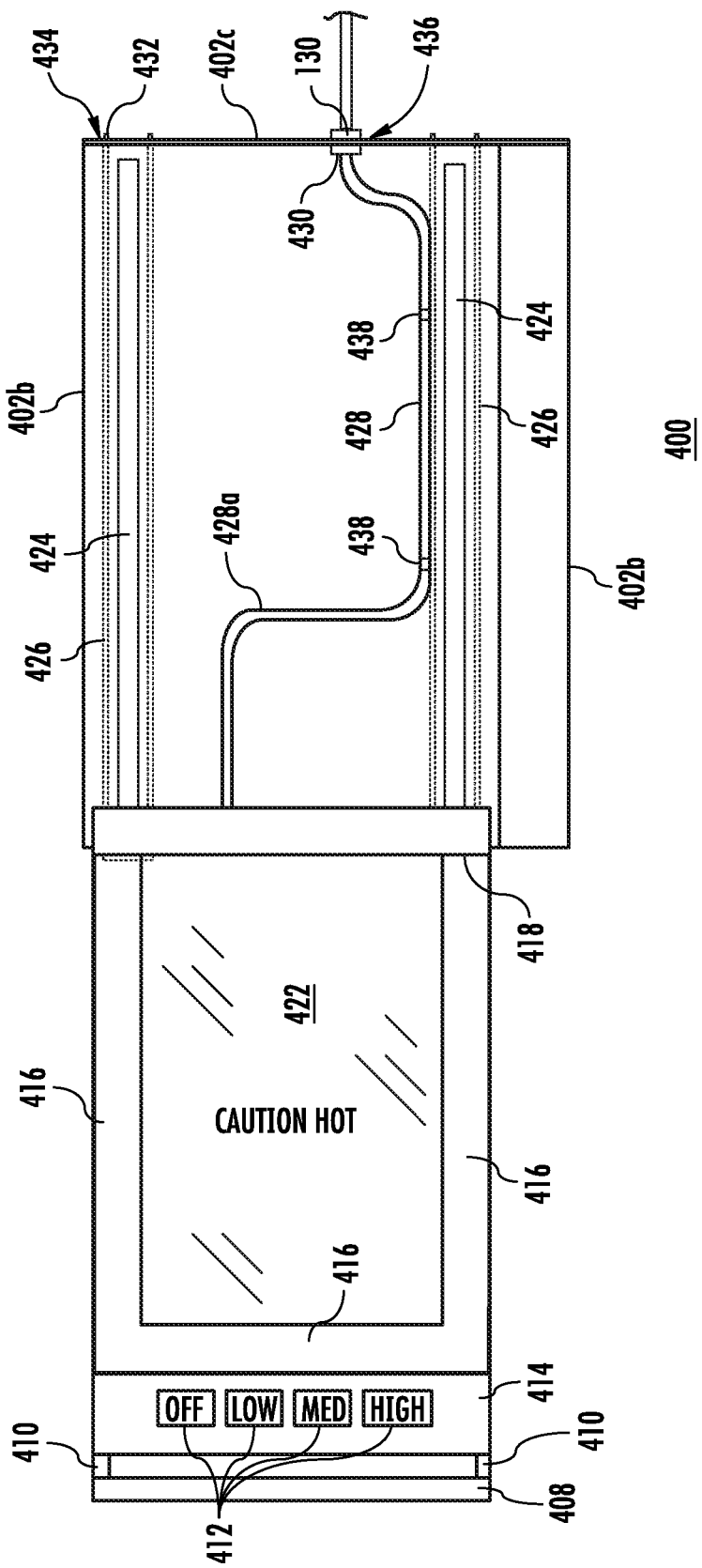
FIG. 8 is a plan view of a warming drawer having a deployed warming drawer module according to an exemplary embodiment of the invention.

With reference to FIGS. 6-8, the exemplary warming drawer module 404 can be movable in a direction (shown by an arrow in the exploded view of FIG. 7) from a first position (e.g., a stored position as shown in FIG. 6) within the warming drawer housing 402 to a second position, such as a deployed position that is at least partially outside of the warming drawer housing 402 and that permits access to an interior of the warming drawer module 404 or access to concealed controls (if equipped) (e.g., 412) of the warming drawer module, as exemplarily illustrated in FIGS. 7 and 8. One of ordinary skill in the art will recognize that the deployed position can include various partially or fully deployed positions of the warming drawer module 404 with respect to the warming drawer housing 402 and is not limited to the illustrated positions in the Figures. The warming drawer module 404 can be, for example, slidably deployable from within the warming drawer housing 402 using various arrangements of various types of drawer slides.

As shown in FIGS. 6-8, the exemplary warming drawer module 404 can include one or more functional components (e.g., heating, electrical, and/or control components) of the warming drawer 400 such that one or more of these functional components move with the warming drawer module 404 between the first position and the second position.

As shown in FIG. 7, the controls of the warming drawer 400 can be disposed on (i.e., on-board) the warming drawer module 404 such that the controls 412 are accessible when the warming drawer module 404 is in a deployed position and concealed by the appliance housing or another door on the appliance housing when the warming drawer 400 is in the first (i.e., closed) position. In other embodiments, the controls can be electrically connected to the warming drawer module 404 but remotely located from the warming drawer module 404, such as on the warming drawer housing 402, the housing (102 in FIGS. 2-5) of the appliance 100, the control panel (106 in FIGS. 2-5) of the appliance 100, etc.

The exemplary warming drawer module 404 can be movable further in the direction shown in FIG. 7 from the first position to a third position in which the warming drawer module 404 is removed completely from the warming drawer housing 402, such that the functional components of the warming drawer are accessible to a user or a repair technician.

The exemplary warming drawer module 404 can include a frame 416 coupled to the front panel 406, and a rear panel 418 coupled to an opposite end of the frame 416, for example, via a bracket portion 420 (which may be formed separately or integrally with the rear panel 418). In the exemplary embodiment, the warming drawer module can be configured without sidewalls (e.g., without a left-hand sidewall or right-hand sidewall) connecting the front panel 406 to the rear panel 418, thereby improving and simplifying a user's access to the warming area, for example, for loading and unloading cookware, cutlery, and/or food into and out of the warming drawer module 404. In other embodiments, the warming drawer can include a left-hand sidewall or a right-hand sidewall connecting one side of the front panel 406 to the rear panel 418. In still other embodiments, the warming drawer can include a left-hand sidewall and a right-hand sidewall connecting both sides of the front panel 406 to the rear panel 418. In another embodiment, the warming drawer module 404 can include only the front panel 406 without a left-hand sidewall, right-hand sidewall, or rear panel 418. The frame 416, rear panel 418, and optional sides can be, for example, stainless steel panels.

As shown in FIG. 7, the exemplary warming drawer module 404 can include a heating device, such as a sheet glass heating element 422, which is disposed in or supported by the frame 416. In the exemplary embodiment, the heating element 422 can form a surface of the floor of the warming drawer module 404, such as a warming surface for supporting (e.g. directly supporting) items to be warmed. In other embodiments, the heating element can be disposed in thermal contact with a floor surface, such as adjacent to or under a floor surface. The heating element 422 can be supplied with power from a power source and controlled by the control panel 412 to selectively provide one or more predetermined temperatures for the warming area in the warming drawer module or the floor surface of the warming drawer module. The heating element 422 can be a resistance heating element, for example, that operates similar to a rear window defroster of an automobile. The glass heating element 422 can include a glass ceramic surface having, for example, a plurality of heating element conducting paths or a uniform conductive coating (clear coating), for example, a 780 W element, thereby providing quick and even heating of items in the warming drawer module. The glass heating element can be easily cleaned, thereby reducing cleaning time and effort by the user. The glass heating element 422 optionally may include a hot surface indicator (e.g., active indicator) for notifying a user or technician when the heating surface is hot, or a passive warning for example painted on the glass surface. The glass heating element 422 also can include an automatic shut-off timer to avoid overheating of the glass heating element 422 or reduce energy consumption in the event a user inadvertently fails to turn off the warming drawer. One of ordinary skill in the art will recognize that other types of heating elements can be provided on the warming drawer module 404, such as a heating element disposed under a glass panel or wire rack or along one or more sides of the warming area within the warming drawer module 404.

With reference to FIG. 8, an exemplary warming drawer module 404 is illustrated in a deployed position (e.g., a fully deployed position). The warming drawer module 404 can include one or more slides 424 for facilitating movement of the warming drawer module 404 (including the functional components, such as the heating element 422) between the stored position in the warming drawer housing 402 and the deployed position outside of the warming drawer housing 402. The slides 424 can be coupled, for example, directly to a part of the warming drawer housing 402, such as the floor for the warming drawer housing 402. In other exemplary embodiments, the warming drawer module 404 optionally can include means for increasing the rigidity and stiffness and reducing deflection of the warming drawer module 404. For example, in the exemplary embodiments illustrated in FIG. 8, the warming drawer module 404 optionally can include one or more channels or supports 426 (shown with dashed lines) (e.g., U-channels having a U-shaped cross-section) to increase the rigidity of the warming drawer module 404, stiffen the slide mounting, reduce deflection of a part of the warming drawer housing 402 or the warming drawer module 404, etc., particularly when the warming drawer module 404 is in a deployed position and/or in a loaded position. A drawer slide 424 can be coupled to the frame 416 of the warming drawer module and to the channels 426, which in turn can be coupled to the warming drawer housing 402 at one or more locations (e.g., floor, sidewall, rear wall, and/or frame of the warming drawer housing). In this way, the warming drawer module 404 can be coupled to the warming drawer housing 402 via one or more channels 426.

In an exemplary embodiment, a channel 426 can include one or more locking features or means for securing the channel 426 to the warming drawer housing 402, for example, at one or more ends of the channel 426 or a location in between the ends of the channel 426. In the exemplary embodiment illustrated in FIGS. 8-10, the locking feature or locking means can include one or more protrusions 432 on an end of the channel that engage an opening 434 in a rear panel 402c of the warming drawer housing 402.

In other embodiments, one or more locking features or means for securing the channels 426 to the warming drawer housing 402 can be coupled to or engage a portion of one or more of a sidewall, floor, frame, etc. of the warming drawer housing 402, one or more corresponding locking features on the sidewall, floor, frame, etc. of the warming drawer housing 402, and/or one or more intervening parts of the warming drawer housing 402. For example, in addition to or alternatively to the features shown in FIG. 8, the locking feature or means can include one of more openings formed in a portion of a front end of the channel 426 for receiving a fastening device and securing the front end of the channel 426, or another portion of the channel 426, to a part of the warming drawer housing 402 that can be easily accessed by a user or technician from a front area of the warming drawer 400 without removing the warming drawer module 404 or warming drawer housing 402.

In exemplary embodiments, the channels or supports 426 can have a cross-sectional shape that increases the rigidity of the channels, such as a U-shaped, I-shaped, T-shaped, L-shaped, square-shaped, rectangular-shaped, circular-shaped, or oval-shaped cross-section. Exemplary embodiments of a channel 426 will be described in detail below with reference to FIGS. 13A-15C.

Figure 9:
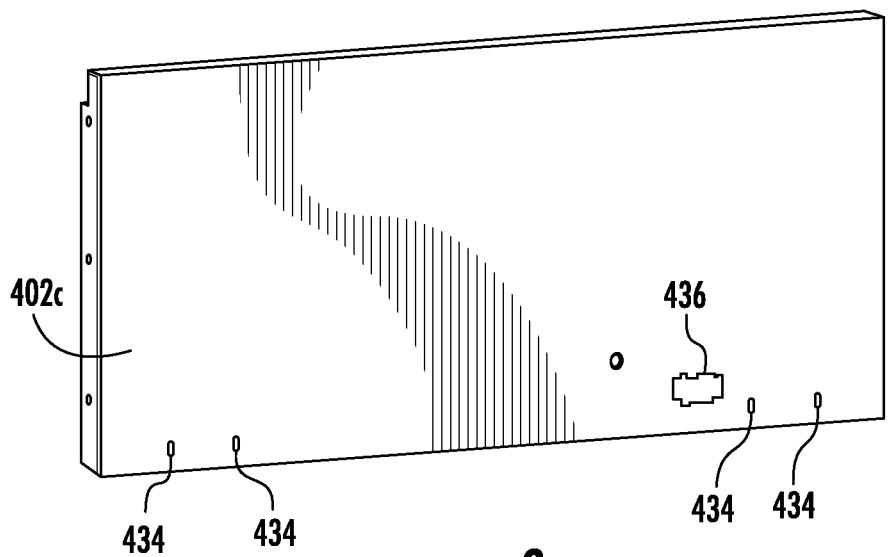
FIG. 9 is a perspective view of a front-facing side of a rear wall of a warming drawer housing according to an exemplary embodiment of the invention.
Figure 10:
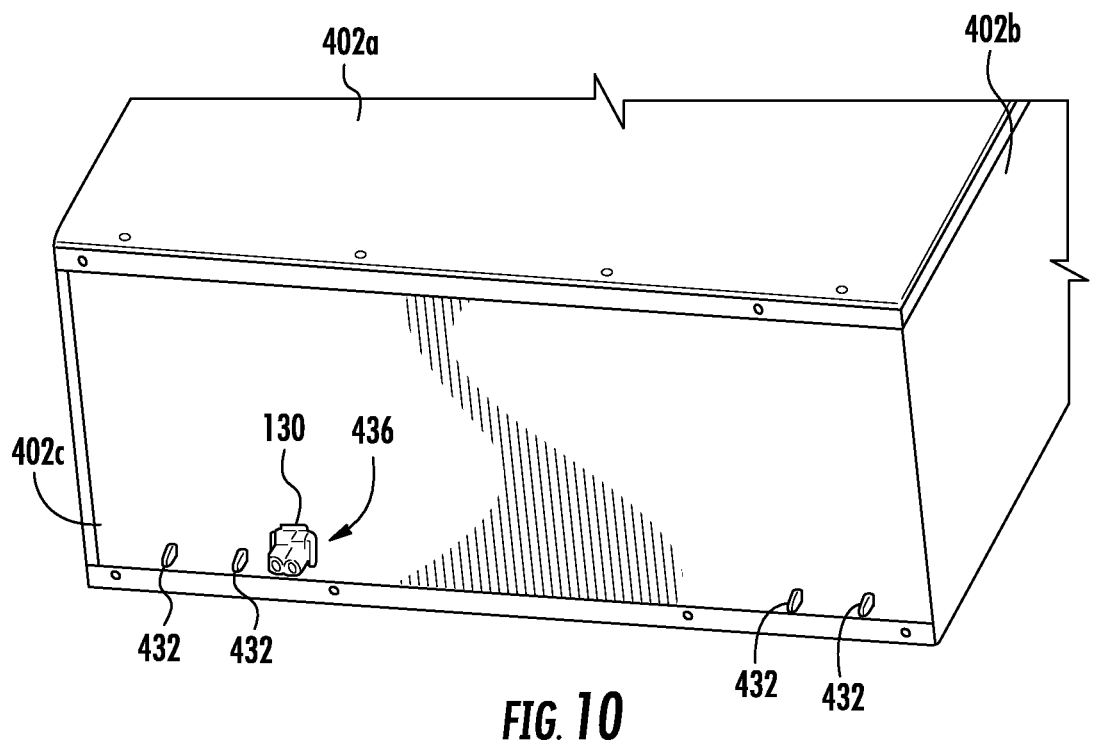
FIG. 10 is a perspective view of a rear-facing side of a rear wall of a warming drawer housing according to an exemplary embodiment of the invention.

The warming drawer module 404 can include a cable harness 428 for guiding one or more electrical wires or cables and/or data wires or cables to one or more components or parts of the warming drawer module 404, as shown in FIG. 8, or one or more individual or bundled wires and/or cables. One or more of the wires or cables can include an electrical connection 430 that is electrically coupled to an electrical connection 130 of the household appliance 100, such as an electrical connection to a power supply connection, data connection, or control connection of the household appliance 100. The electrical connection 130 can be mounted in an opening 436 in the rear panel 402c of the warming drawer housing 402, as shown in FIGS. 8-10.

As shown in FIG. 8, all of the functional components of the warming drawer 400, such as the heater element 422 and controls 412, can be on the movable portion of the warming drawer module 404 such that the functional components move with the movable portion of the warming drawer module 404. During operation, a movable portion of each of the slides 424 can extend respectively from each of the channels 426 to deploy the portion of the warming drawer module 404 having the heating element 422 such that only the channels 426 and the cable harness 428 remain in the warming drawer housing 402 when the warming drawer module 404 is deployed.

The warming drawer module 404 can include cable routing or management devices such that users or repair technicians do not need to route wires or cables when installing and/or removing/repairing the functional parts of the warming drawer module 404. For example, the cable harness 428 can be coupled to one or more of the channels 426 at one or more locations using one or more coupling devices 438 (e.g., cable ties, clamps, or the like) to prevent snagging or kinking of the cable harness 428 and/or wires/cables during movement of the warming drawer module 404 in and out of the warming drawer housing 402. The cable harness 428 can be provided with a freely bendable and movable portion 428a having sufficient length (e.g., slack) to permit the moveable portion of the warming drawer module 404 to move in and out of the warming drawer housing 402 between the stored position and the deployed position without disconnecting the electrical, data, or power supply connection (e.g., 430) of the warming drawer module 404 from the corresponding electrical connection 130 of the warming drawer housing 402.

The exemplary warming drawer module 404 can be easily removed from the warming drawer housing 402, for example, by a user or technician for repair, replacement, modification, and/or cleaning, by disconnecting the channels 426 from the warming drawer housing 402 and the electrical connection 430 from the electrical connection 130 such that all that remains in the warming drawer housing 402 is the electrical connection 130. In this way, all of the functional components of the warming drawer module 404, such as the heating element, controls, and movable parts, can be removed completely from the warming drawer housing 402, for example, to provide easy access from all angles for repairs, etc. With reference to FIGS. 7-12, an exemplary method of removing the warming drawer module 404 and the functional components completely from the warming drawer housing 402 will now be described.

In the illustrated exemplary embodiment, the warming drawer module 404 can be extended to a deployed position, for example, as shown in FIG. 8. If the warming drawer module 404 includes a rear panel 418, then the rear panel 418 of the warming drawer module 404 can be moved (e.g., removed, dislodged, dislocated, or pivoted or folded out of the way) to provide access to the electrical connection 430. For example, as shown in FIGS. 11 and 12, one or more screws 440 can be removed or loosed from the bracket portions 420 (which may be formed separately or integrally with the rear panel 418) to permit the rear panel 418 to pivot forward toward the front panel 406 of the warming drawer module 404 such that a user or technician can reach into the area in the warming drawer housing 402 that is disposed behind the rear panel 418. Next, the electrical connection 430 can be disconnected from the electrical connection 130 of the warming drawer housing 402. Next, a front locking feature located at a front portion 435 of each of the channels 426 may be removed. The front locking feature can include, for example, one or more screws that fasten the front portion 435 of each of the channels 426 to a portion of the warming drawer housing 402 at a location that is accessible to a user or technician from the front of the appliance. Next, the locking features 432 at a rear portion of each end of the channels 426 can be disengaged or unlocked from the corresponding locking features 434 in the rear wall of the warming drawer housing 402. The warming drawer module 404, including the functional components such as the heater element 422, can then be removed completely from the warming drawer housing 402, such that only the electrical connection 130 remains in the warming drawer housing 402. In this way, the exemplary warming drawer module 404 can be easily removed from the warming drawer housing 402, for example, by a user or technician for repair, replacement, modification, and/or cleaning.

When the repair, replacement, modification, and/or cleaning of the warming drawer module 404 is completed, the warming drawer module 404 then can be inserted into the warming drawer housing 402 such that the locking features 432 at a rear portion of each end of the channels 426 engage or locked into the corresponding locking features 434 in the rear wall of the warming drawer housing 402. The front portion 435 of each of the channels 426 can be secured (for example, with one or more screws) to a portion of the warming drawer housing 402 at a location that is accessible to a user or technician from the front of the appliance. Next, the electrical connection 430 can be connected to the electrical connection 130 of the warming drawer housing 402 without the user or technician having to re-route any wiring or cable. If the warming drawer module 404 includes the rear panel 418, then the rear panel 418 can be pivoted rearward away from the front panel 406 of the warming drawer module 404 to close off the access to the area in the warming drawer housing 402 that is disposed behind the warming drawer module 404. One or more screws 440 can be used to fasten the rear panel 418 to the side walls 416 using the bracket portions 420 (which may be formed separately or integrally with the rear panel 418). The warming drawer module 404 then can be moved into the warming drawer housing to the stored position (as shown for example in FIG. 6).

With reference to FIGS. 13A-15C, exemplary embodiments of a channel 426 will now be described.

As shown in FIGS. 13A-13C, the channel 426 can include a body having a rear locking feature 434 and a front portion 435. A slide 424 can be coupled to the channel 426 and extend at least partially along a longitudinal length of the channel 426. The slide 424 can include one or more features, such as one or more tabs or projections 425 on one or more surfaces that can engage one or more corresponding features on one or more surfaces of the channel 426, such as one or more slots or openings 437, for example, at one or more positions along the longitudinal length of the channel 426.

The slide 424 can include various types of off-the-shelf drawer slides or specially designed slides configured to engage the particular features of an exemplary channel 426. For example, the slide 424 can include a telescopic ball-bearing rail that provides smooth handling and support, for example, of up to 55 lbs. The slide 424 can include a soft-close feature to provide a smooth, soft-closing operation of the warming drawer module 404 into the warming drawer housing 402.

With reference to FIG. 14A, an embodiment can include the slide 424 of the warming drawer module 404 being coupled directly to a portion of the warming drawer housing 402, such as a floor of the warming drawer housing 402. In alternative exemplary embodiments, as shown in FIGS. 13A-13C and 14B-14F, the warming drawer module 404 can include the channel 426 for connecting the slide 424 to the warming drawer housing 402. The channel 426 can include, for example, a front portion 435 having one or more locking features, such as one or more openings 437 for receiving a fastener, for securing the channel 426 to a portion 441 of the warming drawer housing 402, such as a front edge of the floor or frame of the warming drawer housing 402.

With reference to the examples shown in FIGS. 13B and 14B-14F, the channel or support 426 can have a cross-sectional shape that increases the rigidity of the channels, such as a U-shaped cross-section in FIG. 13B, a plate-shaped cross-section in FIG. 14B, a plate-shaped cross-section in FIG. 14B, I-shaped, a plate-shaped cross-section in FIG. 14B, a T-shaped cross-section in FIG. 14C, an L-shaped cross-section in FIG. 14D, an I-shaped cross-section in FIG. 14E, a rectangular or tubular-shaped cross-section in FIG. 14F, as well as other shapes (not shown) such as square-shaped, circular-shaped, or oval-shaped cross-section, etc.

Figure 15A:
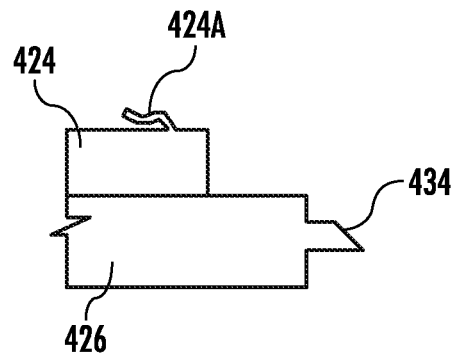
FIGS. 15A-15C are partial side views of a locking feature of a channel according to exemplary embodiments of the invention.
Figure 15B:
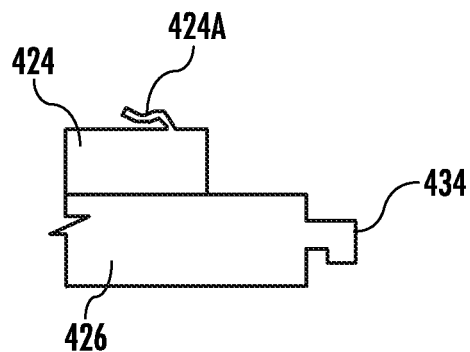
Figure 15C:
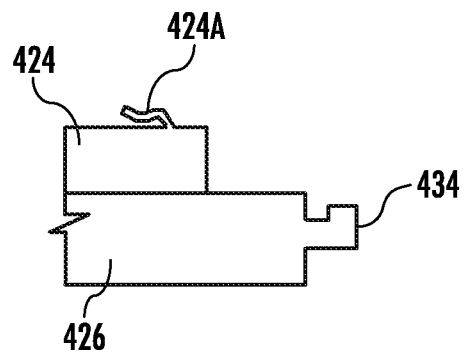

With reference to FIGS. 15A-15C, the channel 426 can include one or more locking features 434 that engage, for example, a corresponding locking feature of the warming drawer housing 402, such as an opening 432 shown in FIGS. 8-10. The locking features 434 can have various shapes configured to engage and fasten the channel 426 to the warming drawer housing 402. One of ordinary skill will recognize that other locking features, shapes, and sizes are contemplated within the spirit and scope of the invention.

With reference again to FIGS. 15A-15C, the slide 424 can include one or more features 424a for engaging or securing the slide 424 to a corresponding feature of a frame, supporting plate, or other part of the warming drawer module 404.

Figure 16A:
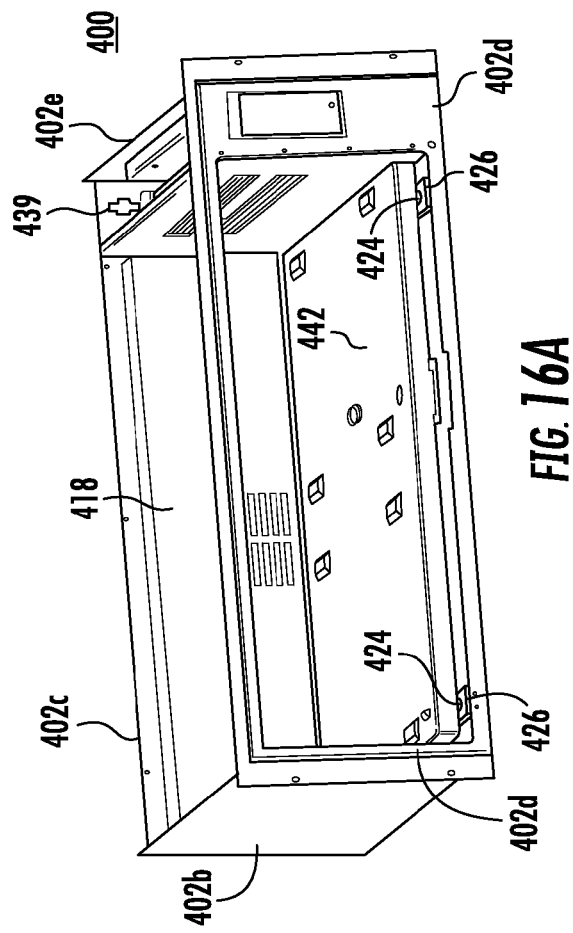
FIGS. 16A-16C are a partial front perspective view, a partial rear perspective view, and a rear plan view, respectively, of a wire/cable management feature according to an exemplary embodiment of the invention.

With reference to FIG. 16A, an exemplary embodiment of a warming drawer 400 is shown in which the warming drawer module 404 includes a channel 426 having a front portion (concealed in FIG. 16A by additional front wall 402e) secured to a portion of a front frame 402d of the warming drawer housing 402, which is accessible to a user or technician from a front of the appliance when the appliance is installed, for example, in adjacent cabinetry. The warming drawer housing 402 optionally may include a front cover part 441 that conceals the front portion of the channel 426 from view. In the embodiment, the channel 426 is coupled to a support plate 442 of the warming drawer module 404, which will be described in more detail below.

Figure 16C:
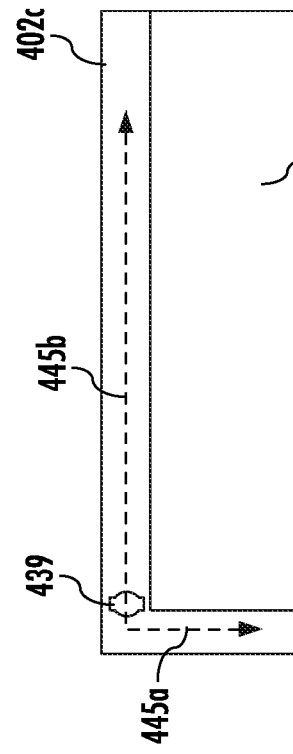
Figure 16B:
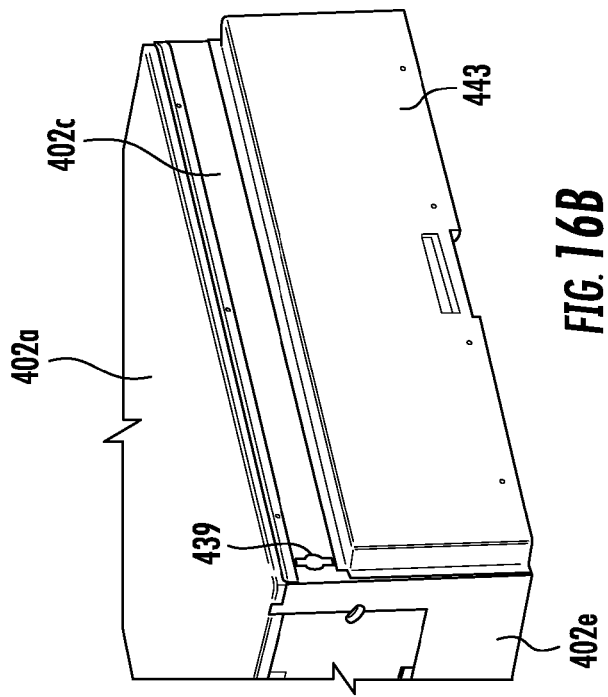

With reference to FIGS. 16A-16C, an exemplary embodiment of a warming drawer 400 can include one or more wire or cable management features for managing the routing of wires or cables outside of the warming drawer housing 402. For example, as shown in FIG. 16A, an exemplary warming drawer 400 can include an opening 439 through which one or more wires or cables, such as a power cord (not shown), extend from an inside of the warming drawer housing 402 to an outside of the warming drawer housing 402. The opening 439 can be formed in the rear panel 402c in an area adjacent to the electrical connection 130 (shown in FIGS. 8-10) or in an area adjacent to a fan compartment or housing having a fan for circulating air in the warming drawer 400. The fan compartment or housing can be formed by an additional wall or a portion of the front frame 402d. The warming drawer housing 402 can include, for example, a second rear panel 443 that forms, or cooperates with the rear panel 402c to form, one or more cable management guides 445a, 445b for guiding one or more wires, cables, or power cords along an outside surface of the warming drawer housing 402 to reduce or prevent a risk of kinking or damage to a wire, cable, or power cord, for example, during manufacturing or installation of the warming drawer 400. The one or more cable management guides 445a, 445b can extend in different directions, such as perpendicular directions, so that the wire, cable, or power cord can be extended in different directions without kinking and while minimizing risk of damage.

Figure 17:
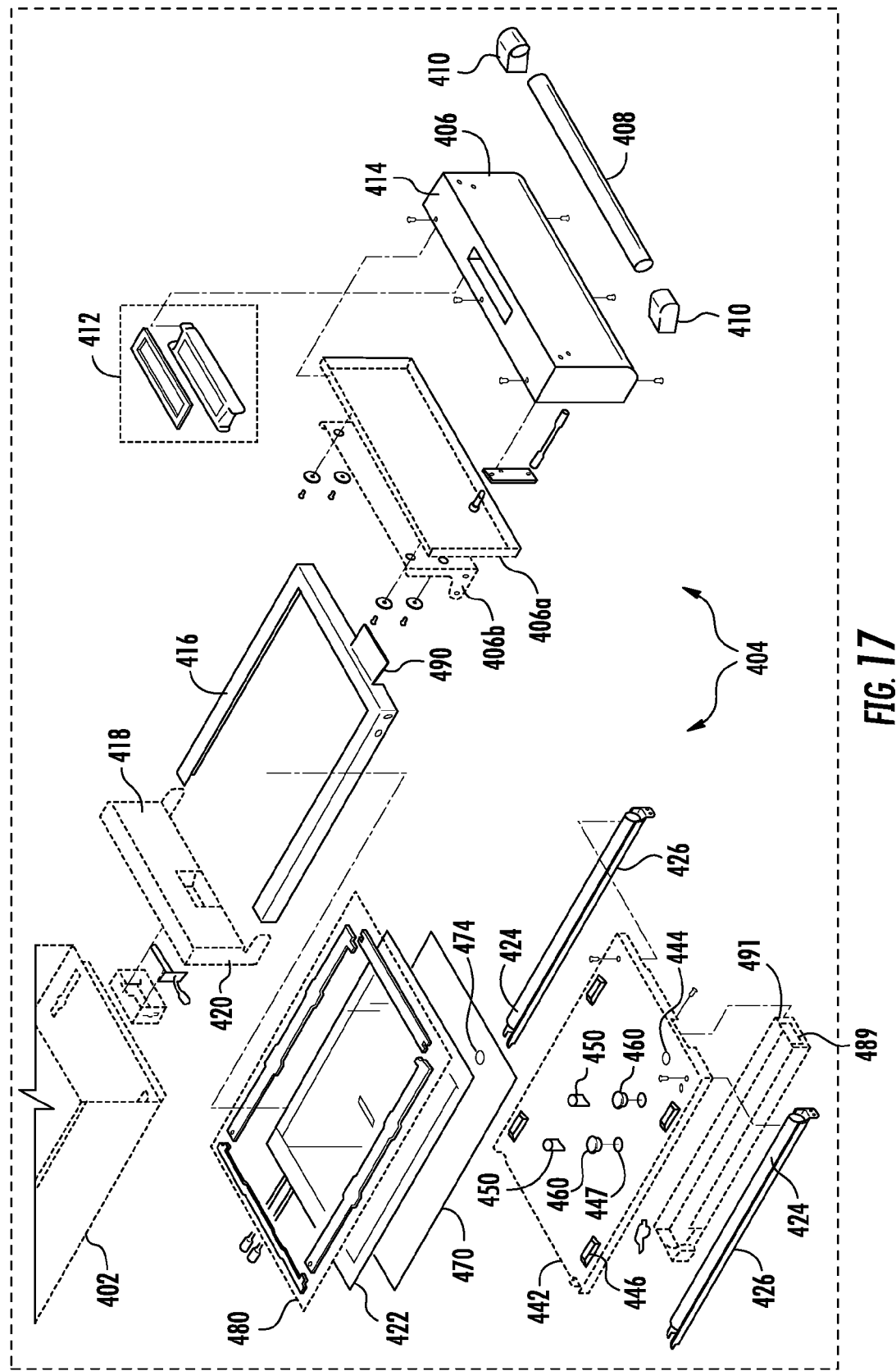
FIG. 17 is an exploded, perspective view of a warming drawer according to an exemplary embodiment of the invention.

With reference to FIG. 17, an exemplary embodiment of a warming drawer 400 will now be described.

The exemplary warming drawer 400 can include, for example, a warming drawer housing 402 and a warming drawer module 404, shown in an exploded view. The warming drawer module 404 can include a front panel 406 having a handle 408 coupled to the front panel 406 via handle mounts 410. The front panel 406 can include a control panel 412 disposed in an opening or recess in an upper surface 414 of the front panel 406. The front panel 406 can include a rear portion 406a that encloses a rear side of the front panel 406 and a bracket 406b for coupling the rear portion 406a to a front portion of a frame 416 of the warming drawer module 404. A rear portion of the frame 416 can be coupled to a rear panel 418 via bracket portions 420 (which may be formed separately or integrally with the rear panel 418).

Figure 18:
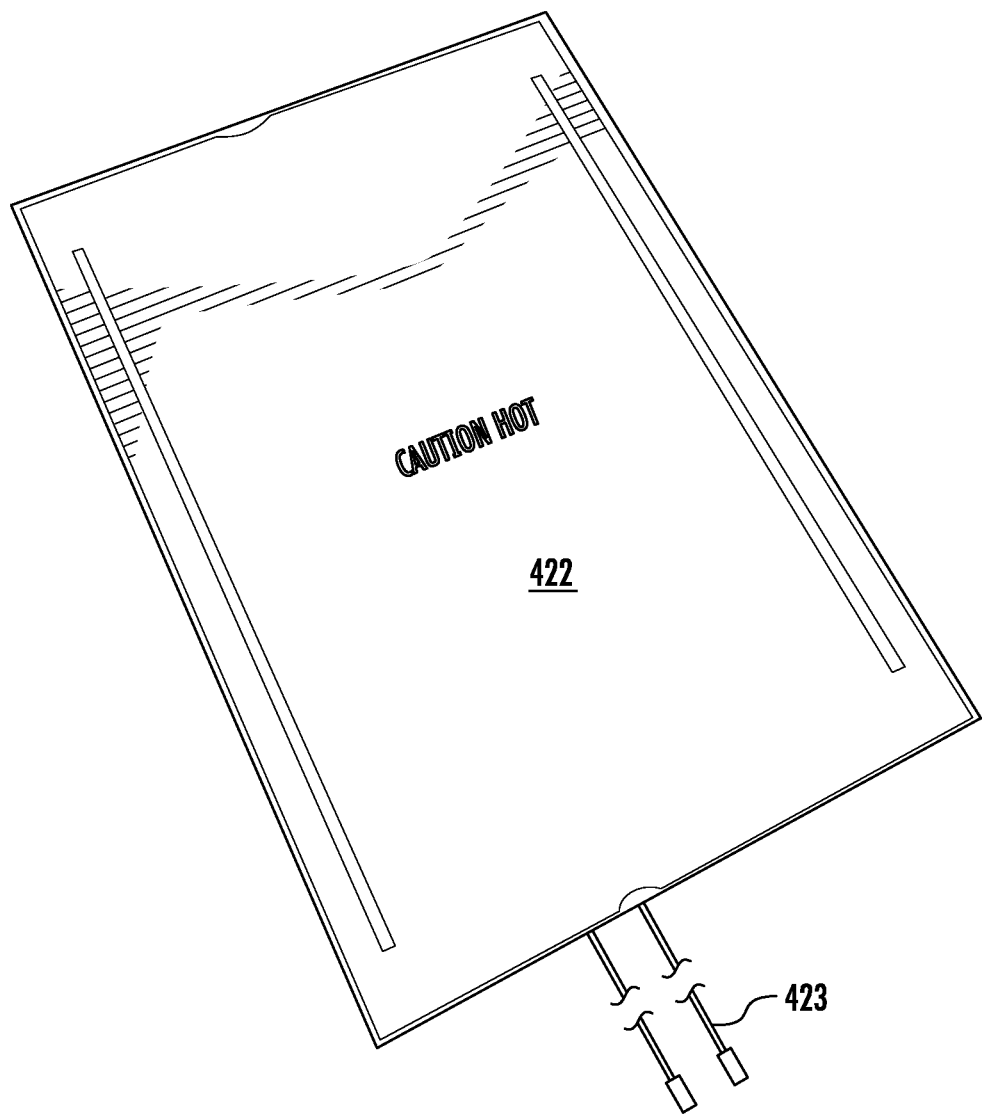
FIG. 18 is a perspective view of a heating element according to an exemplary embodiment of the invention.

The exemplary warming drawer 400 can include a heating device assembly including a glass heating element 422 being supported by a support plate 442 (e.g., stainless steel support plate). An exemplary glass heating element 422, as illustrated in FIG. 18, can include a glass ceramic surface having a plurality of heating element conducting paths or a uniform conductive coating (clear coating), for example, a 780 W element, thereby providing quick and even heating of items in the warming drawer module. The glass heating element can be easily cleaned, thereby reducing cleaning time and effort by the user. The glass heating element 422 optionally may include a hot surface indicator (e.g., active indicator) for notifying a user or technician when the heating surface is hot, or a passive warning for example painted on the glass surface. The glass heating element 422 also can include an automatic shut-off timer to avoid overheating of the glass heating element 422 or reduce energy consumption in the event a user inadvertently fails to turn off the warming drawer.

The support plate 442 can include one or more supporting features, such as a plurality of embosses 446, for supporting the glass heating element 422 a predetermined distance above the support plate 442 and minimizing thermal and electrical contact areas between the heating element 422 and the support plate 442. The plurality of embosses 446 can be disposed in various arrangements to support the heating element 422 depending on the size and shape of the heating element 422. The support plate 442 can include one or more openings 447 for receiving one or more thermostat retainers 460 that support and fix one or more thermostats 450 in a predetermined position and height above the surface of the support plate 442 and against the underside of the glass heating element 422.

A thermally conductive sheet 470 having low thermal resistance and high electrical resistance qualities can be disposed over the entire support plate 442, or at least the contact points between the plurality of embosses 446 and the thermostats 450 and the conductive underside of the glass heating element 422. In other embodiments, individual portions of thermally conductive tape can be provided locally at each location of an emboss 446 and/or thermostat 450. The thermally conductive sheet 470 or thermally conductive tape can include, for example, UL (Underwriter Laboratories) listed silicone electrically insulating material. The glass heating element 422 can be disposed directly on the thermally conductive sheet 470 and supported by the plurality of embosses 446 under the sheet 470.

An upper edge or perimeter surface of the glass heating element 422 can be covered by one or more gasket strips 480 for spills or liquids. The frame 416 can be disposed over the gasket strips 480 and the glass heating element 422, and then secured to the support plate 442. The rear panel 418 may be disposed over a rear strip of the gasket strips 480. In this way, the glass heating element 422 can form a floor of the warming drawer module 404 and the heating surface of the warming drawer module 404, thereby keeping spills or other liquids away from electrical components in the module 404.

The support plate 442 can include a wire guide 491 coupled to an underside of the support plate 442 for guiding one or more wires or cables from the thermostats 460 or other electrical components to the interior of the front panel 406 and the control panel 412. The support plate 442 and the thermally conductive sheet 470 can include corresponding openings 444, 474 to permit the electrical leads from the glass heating element 422 to pass through the support plate 442 and the thermally conductive sheet 470 to the wire guide 491.

The frame 416 can include a drip guard 490 to protect an electrical connection from spills. For example, the drip guard 490 can guide spills, cleaning solutions, etc. from the upper surface of the glass heating element 422 and the frame 416 away from and around a first electrical connector (such as a first wiring harness connector 489) on the support plate 442, which may be disposed at an end of the wire guide 491, and a second electrical connector (such as a second wiring harness connector) in the front panel 406 that leads to the control panel 412, and/or away from the electrical components above or below the support plate 442 or on the glass heating element 422.

The slides 424 can be coupled to the support plate 442, and particularly, for example, to the underside of the support plate 442. The channel 426 can be coupled to the slides 424 to complete the warming drawer module 404. One of ordinary skill will recognize that the parts of the warming drawer module 404 are not limited to being assembled in the order described above and the exemplary embodiment is not required to include all of the parts described. Additional or alternative parts and components also may be included in the warming drawer module 404 within the spirit and scope of the invention.

An exemplary embodiment is directed to a household appliance comprising a warming drawer housing 402 having an interior chamber; and a warming drawer module 404 having a warming area for placing items to be warmed and a heating device 422 that heats the warming area, the warming drawer module 404 being movable between a first position in which the warming drawer module 404 is in the interior chamber of the warming drawer housing 402 and the warming area is concealed from an outside of the warming drawer housing 402 by the warming drawer housing 402, and a second position in which a part of the warming drawer module 404 is outside the warming drawer housing 402 and a portion of the warming area is exposed to the outside of the warming drawer housing 402, wherein the heating device 422 is coupled to and movable with the warming drawer module 404 between the first position and the second position.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A household appliance comprising:
   a warming drawer housing having an interior chamber; and
   a warming drawer module having a warming area for placing items to be warmed and a heating device that heats the warming area, the warming drawer module being movable between a first position in which the warming drawer module is in the interior chamber of the warming drawer housing and the warming area is concealed from an outside of the warming drawer housing by the warming drawer housing, and a second position in which a part of the warming drawer module is outside the warming drawer housing and a portion of the warming area is exposed to the outside of the warming drawer housing,
   wherein the heating device is coupled to and movable with the warming drawer module between the first position and the second position,
   wherein the warming drawer module includes a locking feature that engages the warming drawer housing to releasably couple the warming drawer module to the warming drawer housing such that the warming drawer module is configured to be removable as a single functional assembly, which includes the warming area and the heating device, from the warming drawer housing.

2. The household appliance of claim 1, further comprising:
   a control panel controlling an operation of the heating device, the control panel being movable with the warming drawer module between the first position and the second position.

3. The household appliance of claim 2, further comprising:
   a power source coupled to the control panel and the heating device, the power source supplying power to the control panel when the warming drawer module is in the first position and the second position.

4. The household appliance of claim 1, wherein the heating device includes a resistance heating element.

5. The household appliance of claim 1, wherein the heating device includes a glass ceramic surface having a conductive coating, the glass ceramic surface forming a warming surface that supports the items in the warming area.

6. The household appliance of claim 5, wherein the warming drawer module further includes:
   a frame surrounding the warming surface; and
   a front panel coupled to the frame and covering an opening of the interior chamber of the warming drawer housing when the warming drawer module is in the first position.

7. The household appliance of claim 6, wherein the warming drawer module further includes:
   a rear panel coupled to the frame at an opposite end of the warming surface from the front panel, the opposite end corresponding to a rear location of the frame.

8. The household appliance of claim 1, wherein the warming area of the warming drawer module is defined by a surface that supports the items in the warming area, a front panel covering an opening of the interior chamber of the warming drawer housing when the warming drawer module is in the first position, and a rear panel at an opposite end of the surface from the front panel, wherein the surface extends from the front panel to the rear panel without sidewalls to permit access to the warming area in a lateral direction.

9. The household appliance of claim 1, wherein the warming drawer module includes:
   a cable management device that secures power cables connecting the power source to the heating device to a part of the warming drawer module.

10. The household appliance of claim 1, wherein the warming drawer module includes:
    a telescopic drawer slide directly coupling the warming drawer module to the warming drawer housing such that the warming drawer module is movable between the first position and the second position.

11. The household appliance of claim 1, wherein the warming drawer module includes:
    a rigid channel coupled to the warming drawer housing; and
    a telescopic drawer slide including a pair of telescoping elements, the telescopic drawer slide coupling the warming drawer module to the rigid channel such that the warming drawer module is movable between the first position and the second position.

12. The household appliance of claim 11, wherein the rigid channel includes:
a first locking feature that engages a corresponding first locking feature of the warming drawer housing to couple the warming drawer module to the warming drawer housing.

13. The household appliance of claim 1, wherein the warming drawer module is configured to be movable as a single assembly from the second position to a third position outside of the warming drawer housing in which the single assembly including the heating device is disposed entirely outside of the warming drawer housing.

14. The household appliance of claim 11, wherein the warming drawer module is configured to be movable as a single assembly from the second position to a third position outside of the warming drawer housing in which the single assembly including the heating device, the rigid channel, and the telescopic drawer slide is disposed entirely outside of the warming drawer housing.

15. The household appliance of claim 1, wherein the warming drawer module includes a thermostat that detects a temperature of the heating device, the thermostat in thermal contact with the heating device and movable with the warming drawer module between the first position and the second position.

16. The household appliance of claim 1, wherein the warming drawer module further includes:
coupling means for movably coupling the warming drawer module to the warming drawer housing such that the warming drawer module is movable between the first position and the second position.

17. The household appliance of claim 16, wherein the warming drawer module further includes:
stiffening means for increasing a stiffness and a rigidity of the coupling of the warming drawer module to the warming drawer housing.

18. The household appliance of claim 1, further comprising:
a frame extending from a front of the warming surface to a rear of the warming surface;
a front panel coupled to the frame at the front of the warming surface and covering an opening of the interior chamber of the warming drawer housing when the warming drawer module is in the first position;
a rear panel coupled to the frame at the rear of the warming surface, wherein the rear panel conceals the interior chamber of the warming drawer housing when the warming drawer module is in the second position,
wherein the frame extends from the front panel to the rear panel without sidewalls to permit access to the warming area in a lateral direction;
a thermostat in thermal contact with the heating device, the thermostat detecting a temperature of the heating device; and
a control panel on the front panel, the control panel controlling an operation of the heating device,
wherein the warming drawer module is configured to be removable as a single assembly, which includes the warming area, the heating device, the frame, the front panel, the rear panel, the thermostat, and the control panel, from the warming drawer housing.

19. The household appliance of claim 18, wherein the warming drawer module further comprises:
a rigid channel configured to be removably coupled the warming drawer housing; and a telescopic drawer slide having a pair of telescoping elements, wherein a first element of the pair is coupled to the frame and a second element of the pair is coupled to the rigid channel,
wherein the warming drawer module is configured to be removable as a single assembly, which includes the warming area, the heating device, the frame, the front panel, the rear panel, the thermostat, the control panel, the telescopic drawer slide, and the rigid channel, from the warming drawer housing by uncoupling the rigid channel from the warming drawer housing.

20. The household appliance of claim 1, wherein the locking feature is accessible from a front of the appliance without removing the warming drawer module from the warming drawer housing and without removing the warming drawer housing from the household appliance.

21. The household appliance of claim 1, wherein the warming drawer module includes:
a frame supporting the heating device;
a first telescoping element;
a second telescoping element; and
a rigid channel,
wherein the rigid channel is configured to be removably coupled to the warming drawer housing by the locking feature,
wherein the first telescoping element is fixedly coupled to the rigid channel,
wherein the second telescoping element is fixedly coupled to the frame, and
wherein the second telescoping element is configured to moveably engage the first telescoping element to form a telescopic drawer slide.

22. The household appliance of claim 1, wherein the warming drawer module comprises:
a frame extending from a front of the warming surface to a rear of the warming surface;
a front panel coupled to the frame at the front of the warming surface and covering an opening of the interior chamber of the warming drawer housing when the warming drawer module is in the first position; and
a rear panel coupled to the frame at the rear of the warming surface, wherein the rear panel conceals the interior chamber of the warming drawer housing when the warming drawer module is in the second position,
wherein the frame extends from the front panel to the rear panel without sidewalls to permit access to the warming area in a lateral direction.

23. The household appliance of claim 1, further comprising a control panel for adjustably controlling the heating element based on a selected temperature setting of a plurality of temperature settings when the warming drawer module is in the first position and the second position.

24. A household appliance comprising:
a warming drawer housing having an interior chamber; and
a warming drawer module having a warming area for placing items to be warmed and a heating device that heats the warming area, the warming drawer module being movable between a first position in which the warming drawer module is in the interior chamber of the warming drawer housing and the warming area is concealed from an outside of the warming drawer housing by the warming drawer housing, and a second position in which a part of the warming drawer module is outside the warming drawer housing and a portion of the warming area is exposed to the outside of the warming drawer housing, wherein the heating device is coupled to and movable with the warming drawer module between the first position and the second position;

a control panel controlling an operation of the heating device, the control panel being movable with the warming drawer module between the first position and the second position; and a power source coupled to the control panel and the heating device, the power source supplying power to the control panel when the warming drawer module is in the first position and the second position, wherein the control panel is concealed from view by the warming drawer housing when the warming drawer module is in the first position.

25. A household appliance comprising:

a warming drawer housing having an interior chamber; and a warming drawer module having a warming area for placing items to be warmed and a heating device that heats the warming area, the warming drawer module being movable between a first position in which the warming drawer module is in the interior chamber of the warming drawer housing and the warming area is concealed from an outside of the warming drawer housing by the warming drawer housing, and a second position in which a part of the warming drawer module is outside the warming drawer housing and a portion of the warming area is exposed to the outside of the warming drawer housing, wherein the heating device is coupled to and movable with the warming drawer module between the first position and the second position, wherein the heating device includes a glass ceramic surface having a conductive coating, the glass ceramic surface forming a warming surface that supports the items in the warming area, wherein the warming drawer module further includes:
a frame surrounding the warming surface; and
a front panel coupled to the frame and covering an opening of the interior chamber of the warming drawer housing when the warming drawer module is in the first position, wherein the warming drawer module further includes a rear panel coupled to the frame at an opposite end of the warming surface from the front panel, the opposite end corresponding to a rear location of the frame, wherein the rear panel is movable between a first rear panel position in which the interior chamber of the warming drawer housing is concealed by the rear panel when the warming drawer module is in the second position, and a second rear panel position in which the interior chamber of the warming drawer housing is accessible when the warming drawer module is in the second position.

26. The household appliance of claim 25, wherein the warming drawer module includes a first electrical connection, wherein the warming drawer housing includes a corresponding second electrical connection supplying power to the first electrical connection, wherein the first electrical connection is connected to the second electrical connection when the warming drawer module is in the first position and the second position, and wherein the first electrical connection is connected to the second electrical connection in the interior chamber of the warming drawer housing in an area that is concealed by the rear panel when the rear panel is in the first rear panel position and that is accessible, such that a connection between the first electrical connection and the second electrical connection is accessible for connecting and disconnecting, from a direction facing a front side of the household appliance when the rear panel is in the second rear panel position.

27. A household appliance comprising:

a warming drawer housing having an interior chamber; and a warming drawer module having a warming area for placing items to be warmed and a heating device that heats the warming area, the warming drawer module being movable between a first position in which the warming drawer module is in the interior chamber of the warming drawer housing and the warming area is concealed from an outside of the warming drawer housing by the warming drawer housing, and a second position in which a part of the warming drawer module is outside the warming drawer housing and a portion of the warming area is exposed to the outside of the warming drawer housing, wherein the heating device is coupled to and movable with the warming drawer module between the first position and the second position, wherein the warming drawer module includes:
a rigid channel coupled to the warming drawer housing; and
a telescopic drawer slide including a pair of telescoping elements, the telescopic drawer slide coupling the warming drawer module to the rigid channel such that the warming drawer module is movable between the first position and the second position, wherein the rigid channel includes:
a first locking feature that engages a corresponding first locking feature of the warming drawer housing to couple the warming drawer module to the warming drawer housing, wherein the first locking feature is accessible from a front of the appliance without removing the warming drawer module from the warming drawer housing and without removing the warming drawer housing from the household appliance.

28. The household appliance of claim 27, wherein the first locking feature is on a proximal end of the rigid channel with respect to the front of the appliance, and wherein the corresponding first locking feature is on a front region of the warming drawer housing.

29. The household appliance of claim 27, wherein the rigid channel further includes:

a second locking feature that engages a corresponding second locking feature of the warming drawer housing to couple the warming drawer module to the warming drawer housing, the second locking feature being on a distal end of the rigid channel with respect to the front of the appliance, and the corresponding second locking feature being disposed in a rear region of the interior chamber of the warming drawer housing.

30. The household appliance of claim 29, wherein the corresponding second locking feature includes an opening in a rear wall of the interior chamber of the warming drawer housing, and wherein the second locking feature includes a projection engaging the opening in the rear wall to releasably secure the warming drawer module to the warming drawer housing.

31. The household appliance of claim 28, wherein the corresponding first locking feature is on a front wall of the warming drawer housing.

* * * * *